US009455919B2

(12) United States Patent
Senarath et al.

(10) Patent No.: US 9,455,919 B2
(45) Date of Patent: Sep. 27, 2016

(54) SERVICE PROVISIONING USING ABSTRACTED NETWORK RESOURCE REQUIREMENTS

(71) Applicant: Huawei Technologies Co., Ltd., Shenzhen (CN)

(72) Inventors: Nimal Gamini Senarath, Ottawa (CA); Ho Ting Cheng, Stittsville (CA); Hang Zhang, Nepean (CA); Alex Stephenne, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 14/107,946

(22) Filed: Dec. 16, 2013

(65) Prior Publication Data

US 2014/0219104 A1 Aug. 7, 2014

Related U.S. Application Data

(60) Provisional application No. 61/737,551, filed on Dec. 14, 2012.

(51) Int. Cl.
*H04W 72/00* (2009.01)
*H04L 12/801* (2013.01)
(Continued)

(52) U.S. Cl.
CPC ......... *H04L 47/127* (2013.01); *H04L 41/0896* (2013.01); *H04L 47/823* (2013.01)

(58) Field of Classification Search
CPC ............. H04L 47/127; H04L 41/0896; H04L 47/823; H04W 28/00; H04W 48/00
See application file for complete search history.

(56) References Cited

U.S. PATENT DOCUMENTS

| 5,825,759 A | 10/1998 | Liu |
| 6,697,333 B1 | 2/2004 | Bawa et al. |

(Continued)

FOREIGN PATENT DOCUMENTS

| CA | 2350449 A1 | 12/2002 |
| EP | 1302783 A1 | 4/2003 |

(Continued)

OTHER PUBLICATIONS

Notification of Transmittal of the International Search Report and the Written Opinion of the International Searching Authority, or the Declaration received in Application No. PCT/US2013/075480, mailed Apr. 4, 2014, 12 pages.

(Continued)

*Primary Examiner* — Chandrahas Patel
*Assistant Examiner* — Lan Huong Truong
(74) *Attorney, Agent, or Firm* — Slater Matsil, LLP

(57) ABSTRACT

Interference costs on virtual radio interfaces can be modeled as a function of loading in a wireless network to estimate changes in spectral efficiency and/or resource availability that would result from a provisioning decision. In one example, this modeling is achieved through cost functions that are developed from historical and/or simulated resource cost data corresponding to the wireless network. The cost data may include interference data, spectral efficiency data, and/or loading data for various links over a common period of time (e.g., a month, a year, etc.), and may be analyzed and/or consolidated to obtain correlations between interference costs and loading on the various links in the network. As an example, a cost function may specify an interference cost on one virtual link as a function of loading on one or more neighboring virtual links.

23 Claims, 20 Drawing Sheets

(51) Int. Cl.
*H04L 12/911* (2013.01)
*H04L 12/24* (2006.01)

(56) References Cited

U.S. PATENT DOCUMENTS

| | | | |
|---|---|---|---|
| 6,904,017 B1 | 6/2005 | Meempat et al. | |
| 6,934,249 B1 | 8/2005 | Bertin et al. | |
| 8,369,220 B1* | 2/2013 | Khanna | H04L 41/5022 370/235 |
| 8,849,183 B2 | 9/2014 | Edge et al. | |
| 2004/0205237 A1 | 10/2004 | Doshi et al. | |
| 2006/0083205 A1 | 4/2006 | Buddhikot et al. | |
| 2007/0110034 A1 | 5/2007 | Bennett | |
| 2008/0043709 A1 | 2/2008 | Zhou et al. | |
| 2008/0267088 A1 | 10/2008 | Dunbar et al. | |
| 2009/0141694 A1 | 6/2009 | Shi | |
| 2009/0191858 A1 | 7/2009 | Calisti et al. | |
| 2009/0232089 A1 | 9/2009 | Loft | |
| 2010/0183025 A1 | 7/2010 | Stephens et al. | |
| 2010/0238835 A1 | 9/2010 | Lundgren et al. | |
| 2011/0090853 A1* | 4/2011 | Chandramouli | H04W 28/10 370/329 |
| 2011/0096675 A1 | 4/2011 | Li et al. | |
| 2011/0125921 A1 | 5/2011 | Karenos et al. | |
| 2011/0205901 A1 | 8/2011 | Imai | |
| 2011/0244899 A1* | 10/2011 | Li | H04W 76/023 455/501 |
| 2012/0057456 A1* | 3/2012 | Bogatin | H04W 28/08 370/230.1 |
| 2012/0087276 A1 | 4/2012 | Huang et al. | |
| 2012/0115467 A1 | 5/2012 | Conte et al. | |
| 2012/0289236 A1 | 11/2012 | Xu et al. | |
| 2013/0336118 A1* | 12/2013 | Shaw | H04L 41/0813 370/235 |
| 2014/0086065 A1 | 3/2014 | DeCusatis et al. | |
| 2014/0140210 A1 | 5/2014 | Liu et al. | |
| 2014/0162626 A1* | 6/2014 | Cui | H04W 48/12 455/422.1 |
| 2014/0185581 A1 | 7/2014 | Senarath et al. | |
| 2014/0269332 A1 | 9/2014 | Senarath et al. | |
| 2015/0032495 A1 | 1/2015 | Senarath et al. | |

FOREIGN PATENT DOCUMENTS

| | | |
|---|---|---|
| EP | 1347603 A1 | 9/2003 |
| EP | 2237495 A1 | 10/2010 |
| WO | 2009004661 A2 | 1/2009 |
| WO | 2012059130 A1 | 5/2012 |

OTHER PUBLICATIONS

Extended European Search Report received in European Application No. 14762774.9 dated Dec. 17, 2015, 10 pages.

Wikipedia, "Asynchronous Transfer Mode" http://en.wikipedia.org/wiki/Asynchronous_Transfer_Mode, retrieved May 6, 2014, 7 pages.

Chowdhury, M.Z., "Call Admission Control based on Adaptive Bandwidth Allocation for Multi-Class Services in Wireless Networks.", Information and Communication Technology Convergence (ICTC), Nov. 17-19, 2010, pp. 358-361.

Falkner, M.,"Minimum Cost Traffic Shaping: A User's Perspective on Connection Admission Control." Department of Systems and Computer Engineering, Carleton University, Ottawa, Ontario, Canada 1999, pp. 1-6.

Fitzpatrick, J., "ECHO: A Quality of Service Based Endpoint Centric Handover Scheme for VoIP," IEEE Wireless Communications and Networking Conference, Mar. 31, 2008-Apr. 3, 2008, pp. 2777-2782.

Ge, Y., "Quality of Service Routing in Ad-Hoc Networks Using OLSR." IEEE Proceedings of the 36th Hawaii International Conference on System Sciences, 2003, pp. 1-9.

International Search Report received in Application No. PCT/CN2014/073268, mailed Apr. 30, 2014, 3 pages.

International Search Report and Written Opinion received in International Application No. PCT/CN2014/081863 mailed Oct. 14, 2014, 15 pages.

International Search Report and Written Opinion recieved in Application No. PCT/CN13/75173 mailed Apr. 22, 2014, 11 pages.

Wikipedia, "Least-Cost Routing", Retrieved Jun. 29, 2015 from https://en.wikipedia.org/wiki/Least-cost_routing, 4 pages.

Wikipedia, "Open Shortest Path First" http://en.wikipedia.org/wiki/Open_Shortest_Path_First, retrieved May 6, 2014, 13 pages.

Rossi, M., "Integrated Cost-Based MAC and Routing Techniques for Hop Count Forwarding in Wireless Sensor Networks." IEEE Transactions on Mobile Computing, Apr. 2007 vol. 6, No. 4, pp. 434-448.

Shaaban, Y., "Cost-based admission control for Internet Commerce QoS enhancement." Electronic Commerce Research and Applications,vol. 8, Issue 3, May-Jun. 2009, pp. 142-159.

Vasu, K., "QoS Aware Fuzzy Rule Based Vertical Handoff Decision Algorithm for Wireless Heterogeneous Networks," 2011 National Conference on Communications (NCC), Jan. 28-30, 2011, pp. 1-5.

Yang, X., et al. "Enhanced Position Assisted Soft Handover Algorithm for UTRA," IEEE VTS 54th Vehicular Technology Conference, vol. 2, Oct. 2001, pp. 567-571.

Ye, F. "A Scalable Solution to Minimum Cost Forwarding in Large Sensor Networks." UCLA Computer Science Department, Los Angeles, CA pp. 304-309.

* cited by examiner

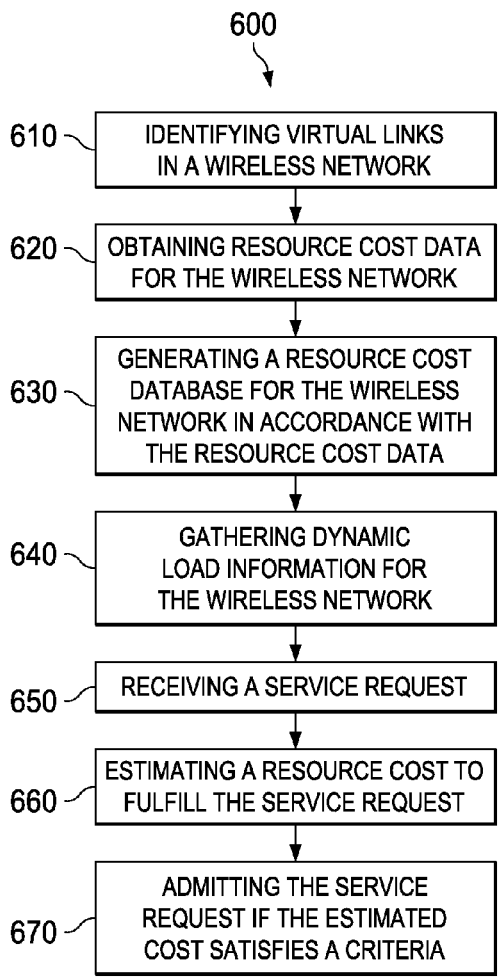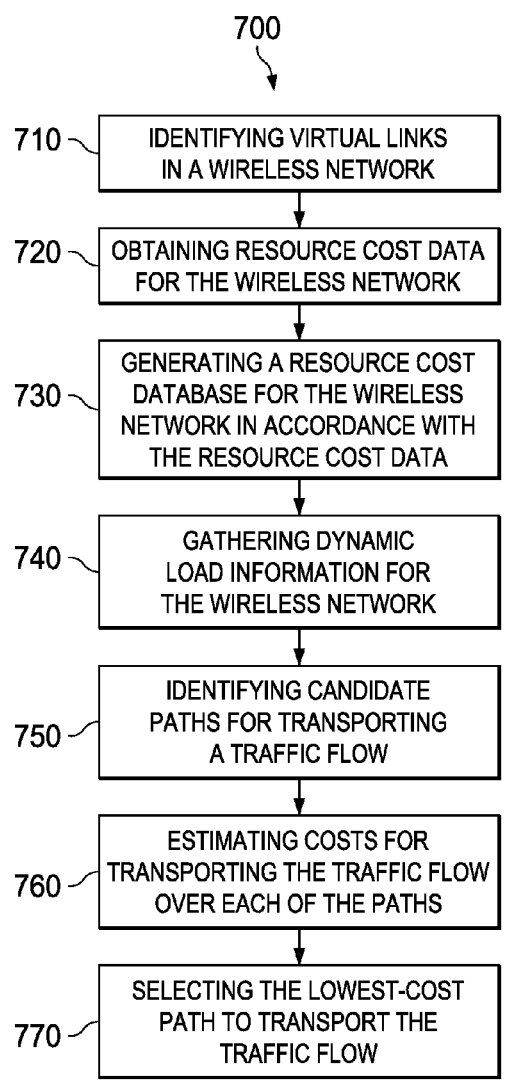
FIG. 6
FIG. 7

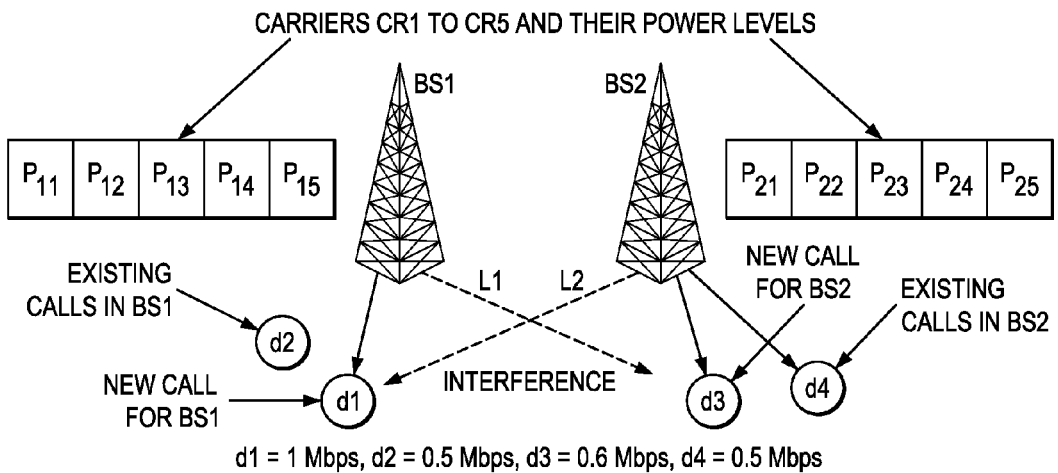
FIG. 26
| SE, Mbps/RB ||||||
|---|---|---|---|---|---|
| L1 | L2 | SE1 | SE2 | SE3 | SE4 |
| 0.1 | 0.1 | 0.25 | 0.1 | 0.24 | 0.2 |
| 0.1 | 0.2 | 0.23 | 0.08 | 0.24 | 0.2 |
| 0.2 | 0.1 | 0.25 | 0.1 | 0.20 | 0.18 |
| 0.2 | 0.2 | 0.23 | 0.08 | 0.20 | 0.18 |
| 0.7 | 0.2 | 0.23 | 0.08 | 0.12 | 0.15 |
| 0.2 | 0.7 | 0.13 | 0.03 | 0.20 | 0.18 |
| 0.7 | 0.7 | 0.13 | 0.03 | 0.12 | 0.15 |
FIG. 27
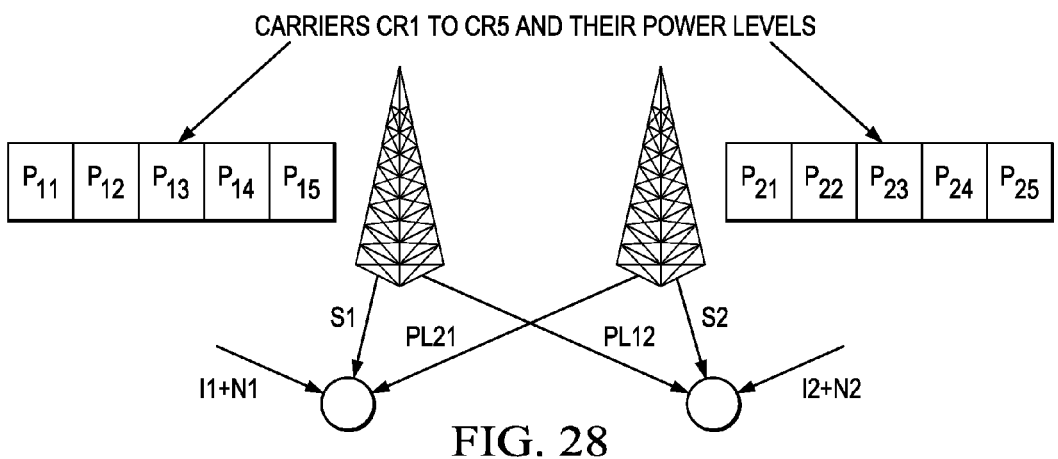
FIG. 28

SERVICE PROVISIONING USING ABSTRACTED NETWORK RESOURCE REQUIREMENTS

This patent application claims priority to U.S. Provisional Application No. 61/737,551, filed on Dec. 14, 2012 and entitled "Method and System for Cost Based Service Provisioning," which is hereby incorporated by reference herein as if reproduced in its entirety.

TECHNICAL FIELD

The present invention relates generally to communications, and more specifically, to methods and systems for service provisioning using abstracted network resource requirements.

BACKGROUND

Network operators are tasked with equitably distributing finite shared resources (e.g., bandwidth, etc.) amongst multiple users in a manner that satisfies the users' collective quality of service (QoS) requirements. Conventional techniques allocate network resources in an ad hoc manner (e.g., on a case-by-case basis), which satisfies QoS requirements at the expense of overall resource utilization efficiency. For example, in wireless environments, spectrum bandwidth may be allocated to satisfy an individual service request without considering how interference resulting from increased traffic load will reduce spectral efficiency over nearby interferences. Accordingly, mechanisms and techniques for more efficiently allocating resources in a network are needed in order to satisfy ever increasing demands of next generation networks.

SUMMARY OF THE INVENTION

Technical advantages are generally achieved, by embodiments of this disclosure which describe methods and systems for service provisioning using abstracted network resource requirements.

In accordance with an embodiment, a method for wireless network virtualization is provided. In this example, the method includes identifying virtual links in a wireless network, obtaining resource cost data for the wireless network, and generating a resource cost database for the wireless network in accordance with the resource cost data. The virtual links include at least a first virtual link corresponding to a first radio interface and a second virtual link corresponding to a second radio interface. The first radio interface and the second radio interface are available for carrying traffic in the wireless network. The resource cost database specifies an interference cost on the first virtual link as a function of loading on the second virtual link. The resource cost database is configured to be used for provisioning resources in the wireless network. An apparatus for performing this method is also provided.

In accordance with another embodiment, a method for provisioning resources is provided. In this example, the method includes obtaining a resource cost database for a wireless network, and gathering network loading information for the wireless network. The network loading information corresponds to an initial interval. The resource cost database specifies an interference cost on a first virtual link as a function of loading on a second virtual link. The first virtual link corresponds to a first radio interface and the second virtual link corresponds to a second radio interface. The first radio interface and the second radio interface are available for carrying traffic in the wireless network. The method further includes provisioning network resources for a subsequent interval in accordance with the network loading information and the resource cost database. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 6 illustrates a flowchart of an embodiment method for performing admission control;

FIG. 7 illustrates a flowchart of an embodiment method for performing path selection;

FIG. 26 illustrates a diagram of yet another embodiment wireless communications network;

FIG. 27 illustrates a diagram of an embodiment resource cost database portion;

FIG. 28 illustrates a diagram of yet another embodiment wireless communications network;

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure provide techniques for modeling interference costs on virtual radio interfaces as a function of loading in a wireless network. More specifically, spectral efficiency on a given radio interface may be substantially affected by interference produced from traffic communicated over nearby interfaces. This reduction in spectral efficiency may represent a cost, which can be modeled as a function of traffic loading on the surrounding radio interfaces. The cost functions can be developed from resource cost data obtained from the wireless network, such as historical interference data, spectral efficiency data, and/or loading data for various links/APs over a period of time (e.g., a month, a year, etc.). This resource cost data can be analyzed and/or consolidated to obtain a resource cost database that models spectral efficiency/interference-costs in the network as a function of loading on the various links. The resource cost database can be used, in conjunction with dynamic loading data, to improve resource provisioning efficiency. For example, the resource cost database may be used to predict the net change in network interference/spectral-efficiency that would result from a provisioning decision prior to approving a service request or performing path selection.

The resource cost database can also be used by network operators (NTOs) to dynamically set or adjust network resource pricing. More specifically, next generation networks may distribute network resources using a marketplace architecture in which virtual or physical resources are offered for sale at prices that vary with supply and demand. For example, pricing for wireless spectrum bandwidth (virtual or otherwise) may be adjusted based on resource availability (or on average spectral-efficiency-per-resource-unit), which can be estimated using the resource cost database. These and other aspects are explained in greater detail below.

Figure 1:
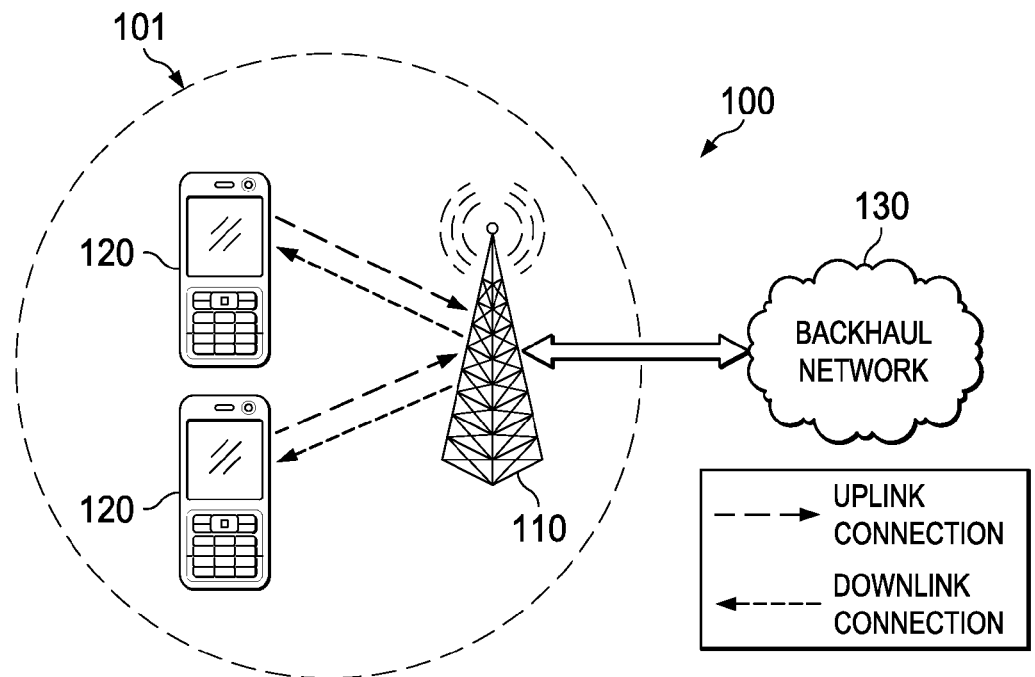
FIG. 1 illustrates a diagram of an embodiment wireless communications network.

FIG. 1 illustrates a network 100 for communicating data. The network 100 comprises an access point (AP) 110 having a coverage area 101, a plurality of stations (STAs) 120, and a backhaul network 130. The AP 110 may comprise any component capable of providing wireless access by, inter alia, establishing uplink (dashed line) and/or downlink (dotted line) connections with the STAs 120, such as a base station, an enhanced base station (eNB), a femtocell, and other wirelessly enabled devices. The STAs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
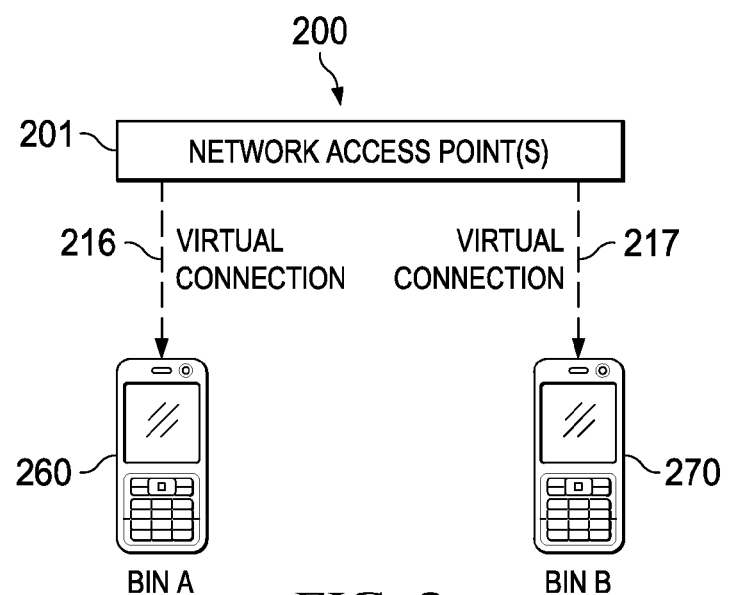
FIG. 2 illustrates a diagram of another embodiment wireless communications network.

Aspects of this disclosure model interference on virtual radio interfaces as a function of loading on nearby radio interfaces. FIG. 2 illustrates a wireless network 200 comprising network access point(s) (APs) 201 that service a geographical area including BIN A and BIN B. The wireless network AP(s) 201 are configured to provide wireless access in BIN A and BIN B using virtual radio interfaces 216 and 217, respectively. For purposes of this disclosure, the term virtual radio interface refers to radio interfaces that are established or capable of being established in a wireless network. For example, the virtual radio interface 216 may correspond to a link that is not yet established, but would otherwise be available for transporting service flows in the network 200. The virtual radio interface 216 may also refer to a link that is currently transporting service flows.

An interference component on the virtual radio interface 217 can be modeled as a function of loading on the virtual radio interface 216. This modeling can be based on historical information (e.g., traffic patterns, resource assignments, interference, etc.) of the network 200. For instance, historical information may be analyzed to determine a correlation between interference on the virtual radio interface 217 and loading on the virtual radio interface 216. Such correlations may include components for other traffic parameters as well, e.g., traffic type, etc.

Figure 3:
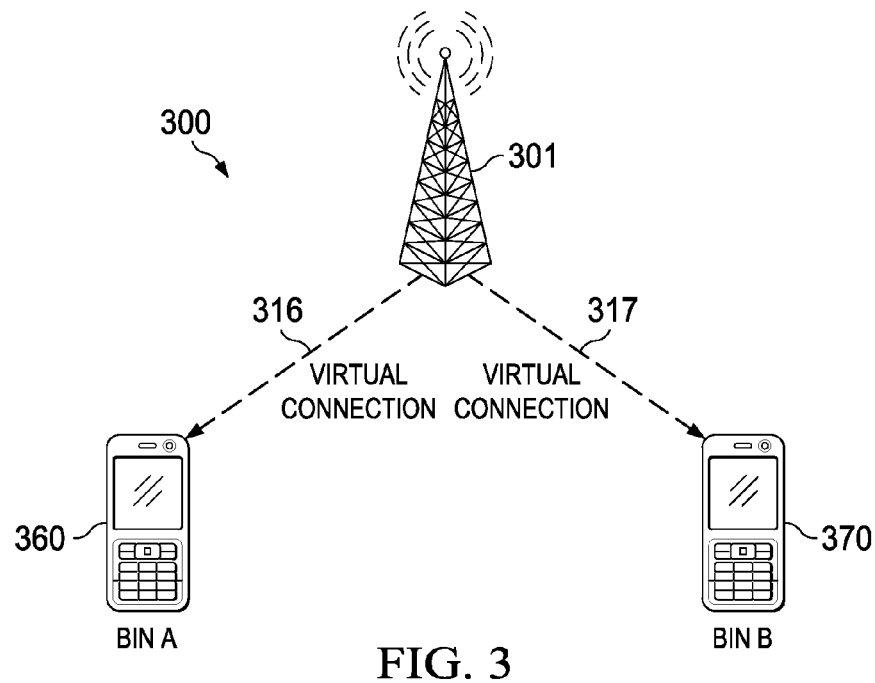
FIG. 3 illustrates a diagram of yet another embodiment wireless communications network.
Figure 4:
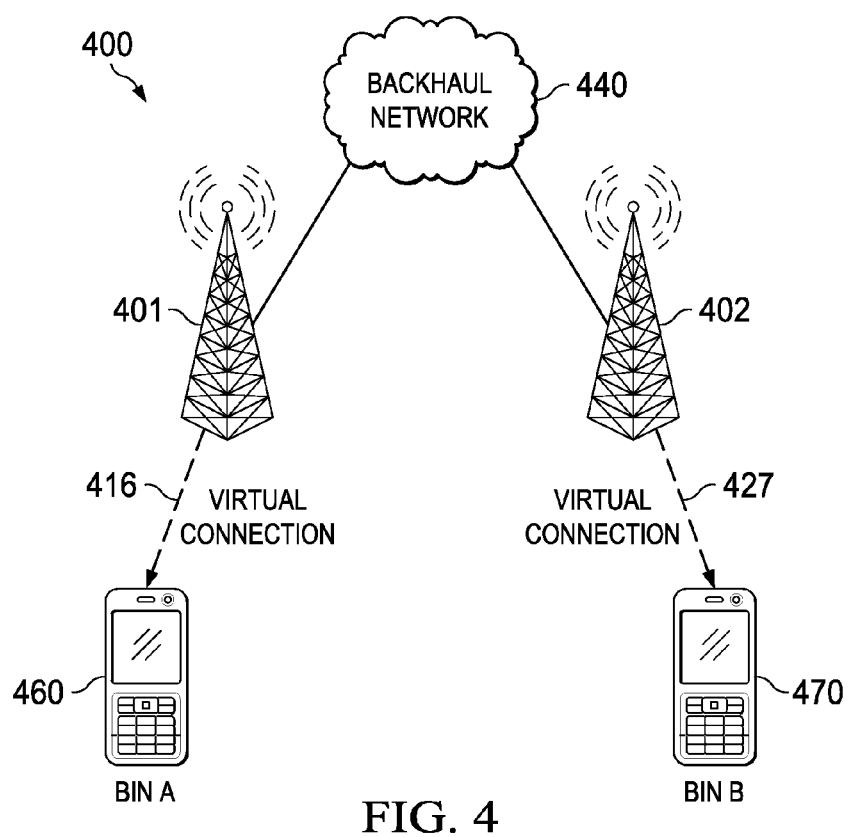
FIG. 4 illustrates a diagram of yet another embodiment wireless communications network.
Figure 5:
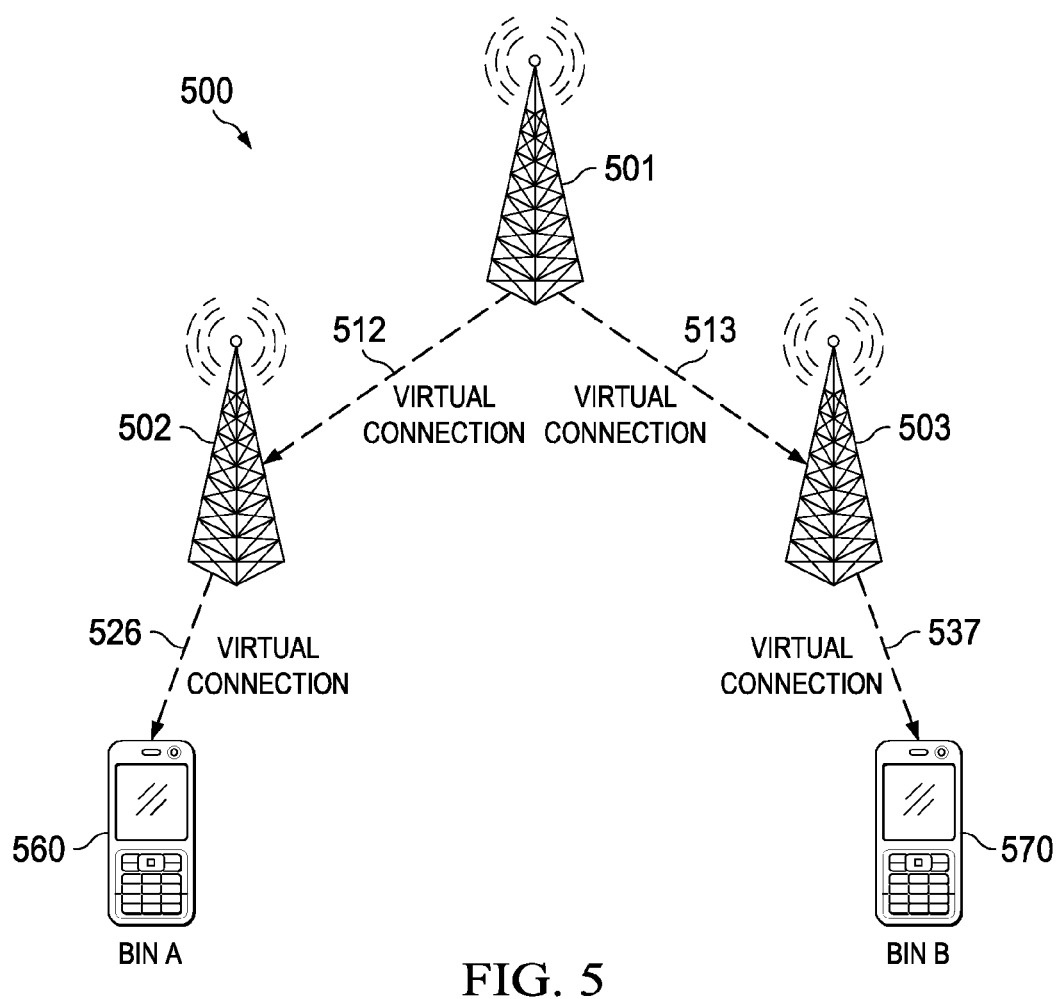
FIG. 5 illustrates a diagram of yet another embodiment wireless communications network.

Interference-load dependencies can be modeled between virtual radio interfaces associated with the same AP. FIG. 3 illustrates a wireless network 300 in which load dependencies are modeled for wireless links 316, 317 associated with a single AP 301. Interference-load dependencies can also be modeled between virtual radio interfaces associated with different APs. FIG. 4 illustrates a wireless network 400 in which load dependencies are modeled for wireless links 416, 427 associated with APs 401, 402, respectively. Interference-load dependencies can also be modeled between virtual radio interfaces in wireless mesh networks. FIG. 5 illustrates a wireless mesh network 500 in which load dependencies are modeled for virtual radio interfaces 512, 513, 526, and 537. Notably, the virtual radio interfaces 512 and 513 interconnect the AP 501 to the APs 502 and 503, respectively, while the virtual radio interfaces 526 and 537 interconnect the APs 502 and 503 with the mobile stations 560 and 570, respectively. Interference-load dependencies may be modeled between all the virtual radio interfaces 512, 513, 526, and 537 in the wireless mesh network 500. For example, interference on the virtual radio interface 512 may be modeled as a function of loading on each of the virtual radio interfaces 513, 526, and 537.

Aspects of this disclosure provide techniques for creating cumulative resource cost databases that model interference-load dependencies in a wireless network, and for using the cumulative resource cost databases to provision resources. For example, a cumulative resource cost database may be used when performing admission control. FIG. 6 illustrates an embodiment method 600 for performing admission control in accordance with a resource cost database, as may be performed by a network device (e.g., central entity, NTO, etc.). As shown, the method 600 begins with step 610, where the network device identifies virtual links in a wireless network. The virtual links may correspond to radio interfaces available for carrying traffic flows in the wireless network. Subsequently, the method 600 proceeds to step 620, where the network device obtains resource cost data for the wireless network. Thereafter, the method 600 proceeds to step 630, where the network device generates a resource cost database for the wireless network in accordance with the resource cost data. In one embodiment, the resource cost database specifies interference costs in the network as a function of loading on the virtual links. In another embodiment, the resource cost database specifies a spectral efficiency for each of the virtual links as a function of loading and/or interference in the network. Next, the method 600 proceeds to step 640, with the network device gathers dynamic load information for the wireless network. Dynamic load information may specify current loading on radio interfaces in the wireless network, as well as current interference information. Next, the method 600 proceeds to step 650, where the network device receives a service request. The service request may request transportation of a traffic flow to a user device at a specific location in the wireless network e.g., a BIN or geographical region. Thereafter, the method 600 proceeds to step 660, where the network device estimates a resource cost to fulfill the service request. In an embodiment, the resource cost corresponds to a reduction in resource availability of the network as a result of admitting the service request, and may include a direct cost component and an indirect cost component. The direct cost component may correspond to an amount of resources used to directly transport the service flow over a path. The indirect component may correspond to a reduction in spectral efficiency in the network (e.g., reduced bandwidth on neighboring radio interfaces) as a result of interference produced when transporting the service flow over the path. In another embodiment, the resource cost may correspond to a price or value to be paid for reserving (or otherwise using) the resources needed to satisfy the service request, which may fluctuate based on supply and demand. Accordingly, the price for each additional resource unit may increase as network loading increases, e.g., as resource availability decreases. In some embodiments, resource pricing may be negotiated between the user and the network operator, or by an intermediary, e.g., a telephone network service provider, etc. In other embodiments, resource pricing may be set according to a function/formula.

Next, the method 600 proceeds to step 670, where the network device admits the service request if the estimated cost satisfies a criteria. In one example, the estimated cost satisfies the criteria when the cost is below a threshold. In another example, the estimated cost satisfies the criteria when the service request can be admitted without affecting the network's ability to satisfy existing users' quality of service (QoS) requirements.

Cumulative resource cost databases can also be used during path selection. FIG. 7 illustrates an embodiment method 700 for using a resource cost database to perform path selection, as may be performed by a network device (e.g., central entity, NTO, etc.). As shown, the method 700 begins with steps 710-740, where the network device builds a resource cost database for the wireless network and gathers dynamic load information for the wireless network. Thereafter, the method 700 proceeds to step 750, where the network device identifies candidate paths for transporting a traffic flow. The candidate paths may be paths capable of satisfying quality of service requirements of the traffic flow. Thereafter, the method 700 proceeds to step 760, where the network device estimates a cost for transporting the traffic flow over each of the paths. The cost for transporting the traffic flow over the path may include a cost component for each link in the path. The cost components can be computed using the resource cost database in conjunction with current network load data. The cost components may then be summed to obtain the cumulative cost for the path. Next, the method 700 proceeds to step 770, where the network device selects the lowest cost path to transport the traffic flow.

Figure 8:
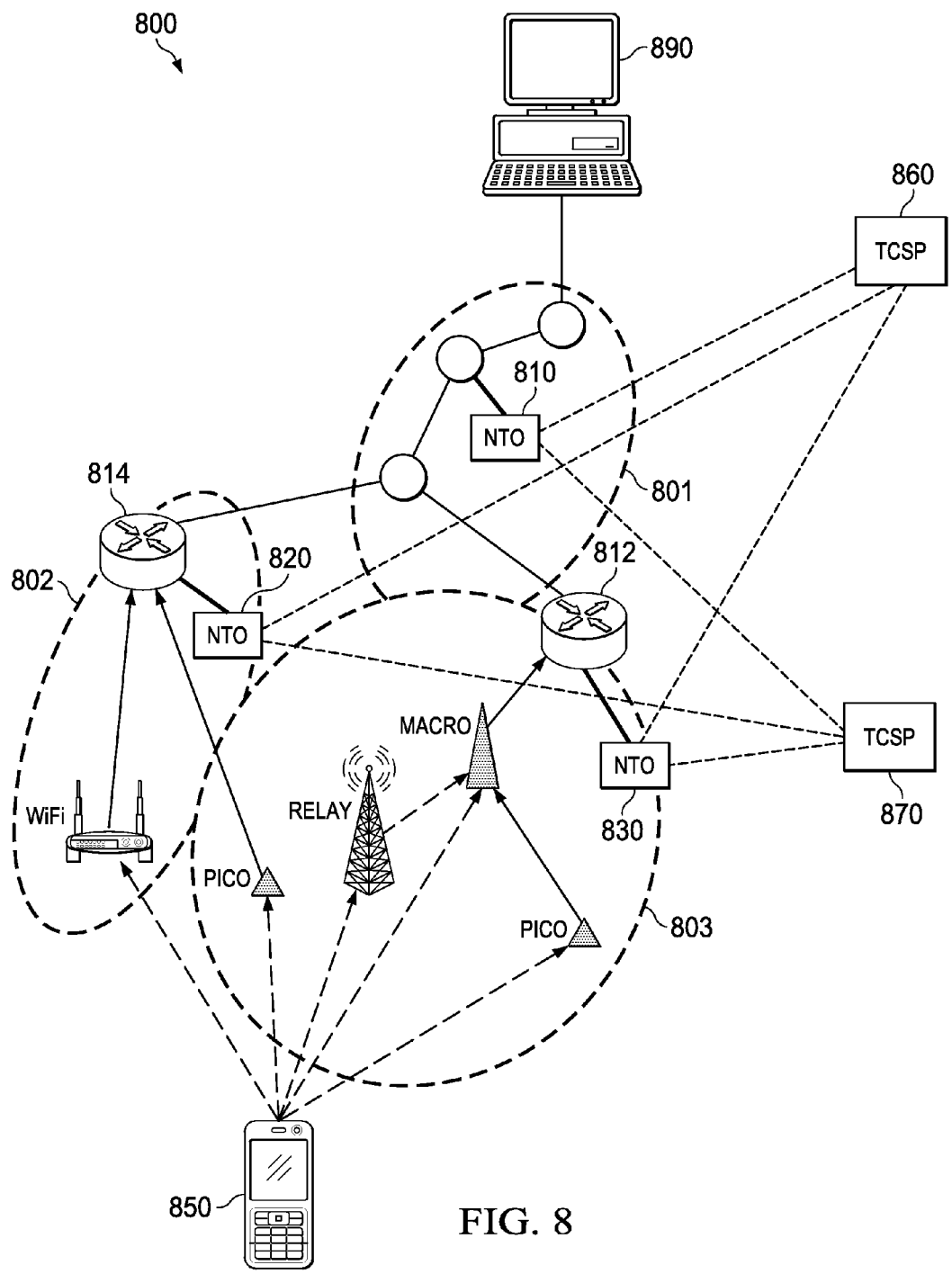
FIG. 8 illustrates a diagram of yet another embodiment communications network.

Embodiment techniques may be performed, or otherwise facilitated, by central entities, such as telecommunications service providers (TCSPs). FIG. 8 illustrates a network 800 in which central entities 860, 870 interact with NTOs 810, 820, 830 to model interference-load dependencies for access networks 801-803. The central entities may also perform or facilitate resource provisioning for traffic flows communicated between the mobile station 850 and the content provider 890. As shown, the NTO 810 operates a core network 801, and the NTOs 820, 830 operate access networks 802, 803. The core network 801 may be any type of network capable of interconnecting the access networks 802, 803 with one another and/or with the content provider 890. In some embodiments, the access network 802 corresponds to a wireless local area network (WLAN) serviced by a Wi-Fi access point (AP), and the access network 803 corresponds to a radio access network (RAN) serviced by one or more network APs, e.g., macro base stations (BSs), pico BSs, relays, etc. Interactions between the core network 801 and the access networks 802, 803 may be handled by edge routers 812, 813.

The central entities 860, 870 may coordinate the modeling of model interference-load dependencies between the networks 802 and 803. In one example, the central entity 870 may build a resource cost database for the networks 802, 803 by retrieving resource cost information from the NTOs 820, 830, and developing correlations and/or functional relationships between interference and loading on virtual wireless links in the networks 802, 803. Additionally, the central entity 870 may provision resources directly by collecting dynamic loading information from the networks 802, 803, and using the loading information to estimate spectral efficiency in the network under different allocation plans. Alternatively, the central entity 870 may indirectly provision resources in the network by distributing the resource cost database to the NTOs 820, 830 so that spectral efficiency evaluations may be performed locally.

Figure 9:
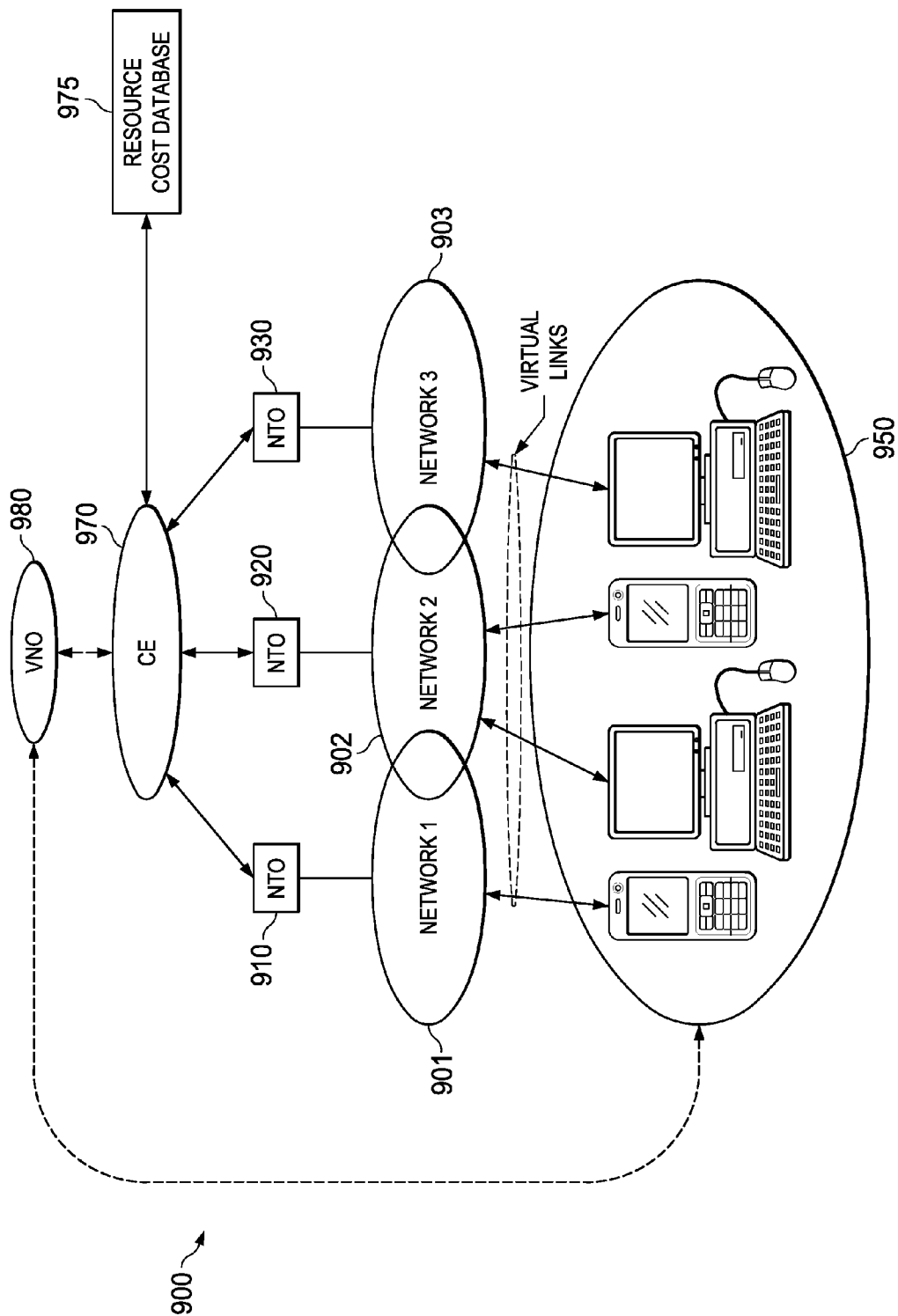
FIG. 9 illustrates a diagram of an embodiment network architecture.

Resource cost databases can be used to model virtual links in neighboring wireless access networks. FIG. 9 illustrates a network architecture 900 in which a virtual network operator (VNO) 980 models virtual links in networks 901-903. More specifically, the VNO 980 may control a central entity 970, which may be used to retrieve resource cost data for the networks 901-903 from the NTOs 910-920, and to build a resource cost database 975 based on the retrieved resource cost data.

Figure 10:
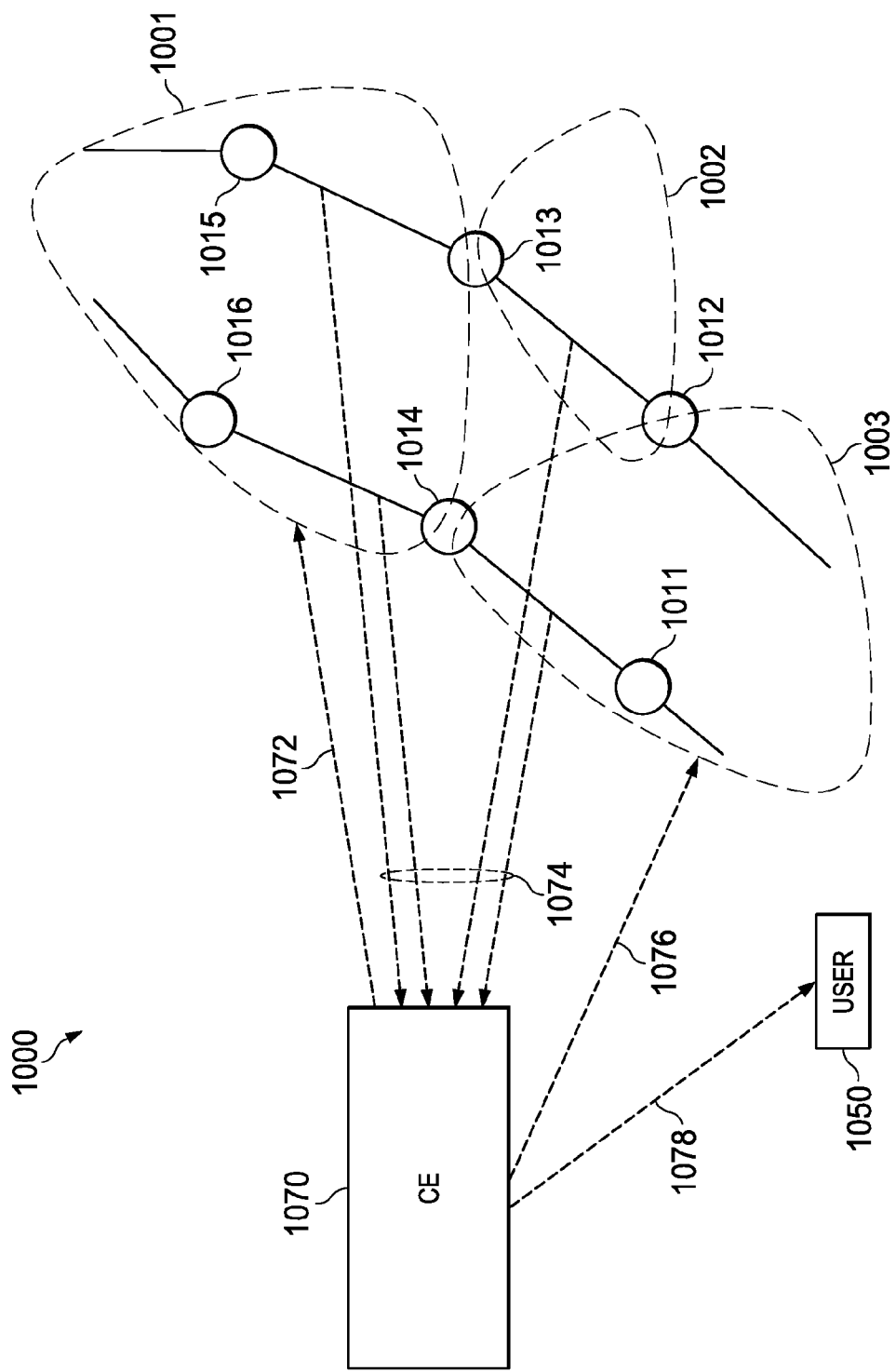
FIG. 10 illustrates a diagram of another embodiment network architecture.

Resource cost databases can also be used to provision resources in a wireless network based on dynamic network information (e.g., loading information, etc.). FIG. 10 illustrates a network architecture 1000 which a central entity 1010 performs resource provisioning in network segments 1001, 1002, and 1003 in view of a service request received from a user 1050. The central entity sends a request 1072 to the networks devices 1011-1016 to request loading information for the network segments 1001, 1002, and 1003. The devices 1011-1016 return response messages 1074 to the central entity 1070, which include loading information for the network segments 1001, 1002, and 1003. The central entity 1070 uses the network cost data to make provisioning decisions, which are distributed to the users 1050 and network devices 1011-1016 via provisioning instructions 1076, 1078. The provisioning decisions may relate to admission and/or path selection. In some embodiments, the central entity 1070 requests new cost information each time a new service request is received. In other embodiments, the central entity 1070 periodically, e.g., every second, every five seconds, during the course of network operation.

Figure 11:
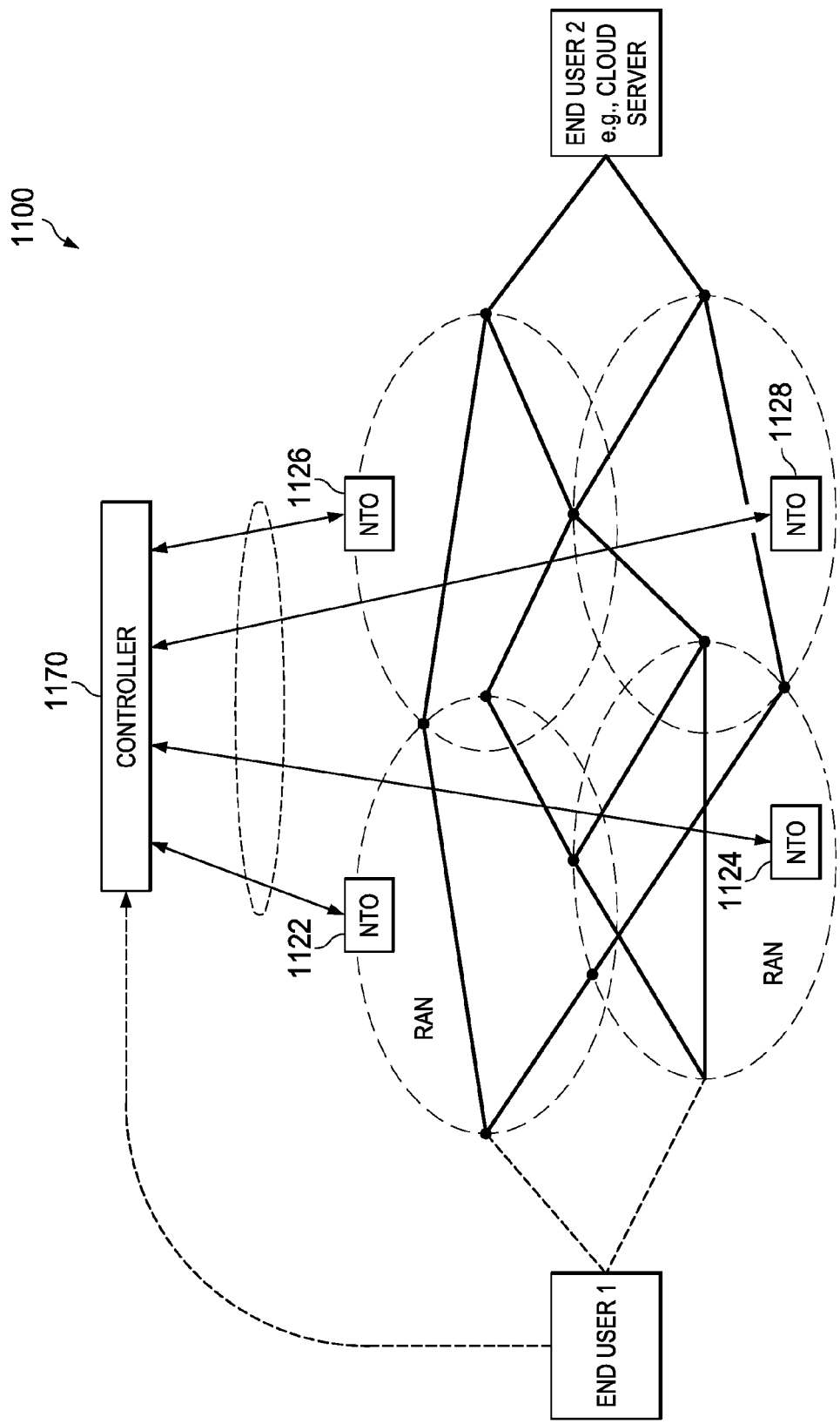
FIG. 11 illustrates a diagram of yet another embodiment network architecture.

Central controllers can interact with NTOs to facilitate provisioning (e.g., admission, resource allocation, link reservation, etc.) in wireless and/or wireline networks. FIG. 11 illustrates an embodiment network 1100 comprising a controller 1170 configured to interact which NTOs 1122-1128 to facilitate resource provisioning based on wireless network virtualization. As shown, the NTOs 1122, 1124 operate radio access networks (RANs). In some embodiments, the NTOs 1126, 1128 may also operate RANs. In other embodiments, the NTOs 1126, 1128 will operate wireline networks, e.g., the NTOs 1126, 1128 may be internet service providers (ISPs). In some embodiments, the controller 1170 may make provisioning decisions based on cost information provided by the NTOs 1122-1128. For example, the NTOs 1122-1128 may calculate resource costs based on, inter alia, current loading conditions in the network 1100, and then communicate the cost information to the controller 1170. The controller 1170 may then use the cost information to make provisioning decisions. It yet another example, the controller 1170 may perform cost estimations/calculations using historical statistics and/or current loading information provided by the NTOs 1122-1128. In one example, the NTOs 1122-1128 may provide resource cost information (e.g., resource cost tables, etc.) to the controller 1170. This resource cost information may be historical information that is reported semi-statically (e.g., weekly, monthly, etc.) to reduce overhead/congestion in the control plane of the network 1100. The controller 1170 may use the resource cost information to develop a resource cost database for modeling interference-load dependencies between virtual links in the network 1100. Additionally, the NTOs 1122-1128 may dynamically communicate current loading information (e.g., presenting loading on the radio interfaces, etc.) to the controller 1170. The controller 1170 may use the current loading information to perform provisioning in accordance with the resource cost database. For example, the controller 1170 may plug the current loading information into the interference-load functions. Thereafter, the controller 1170 may be able to project interference costs prior to making provisioning decisions. As one example, the controller 1170 may be able to determine whether projected interference costs would outweigh the benefit of transporting a new service flow over a virtual interface prior to approving a service request.

In some embodiments, a resource cost database may specify interference-load dependencies for each bin in a wireless network. The interference-load dependencies may be functions that consider various parameters, including different link load values (serving cell and neighbor cell) and different service types. Resource cost database may permit virtual simulations to be performed based on current loading/utility and variation of links. In some embodiments, central controllers make provisioning decisions (e.g., admission, path selection, etc.) based on an estimated data rate to be required by a service flow (or potential service flow) and an estimated resource availability on a given path or link. The required data rate of a service flow can be estimated based on, inter alia, a service type associated with the service flow and a service history (e.g., current or past data rates, etc.) of the service flow. Resource availability may be quantized (for database entries), and can include parameters accounting for neighboring network traffic density distributions.

Load/utility based resource usage functions for each bin can be provided beforehand (e.g., generated from offline evaluations) to a controller for different link load values (serving cell and neighbor cell) and different service types. Resource usage to cost conversion functions may also be provided by NTOs. Links provide current loading information at regular intervals. NTOs use the current loading information to update cost function parameters and databases.

Figure 12:
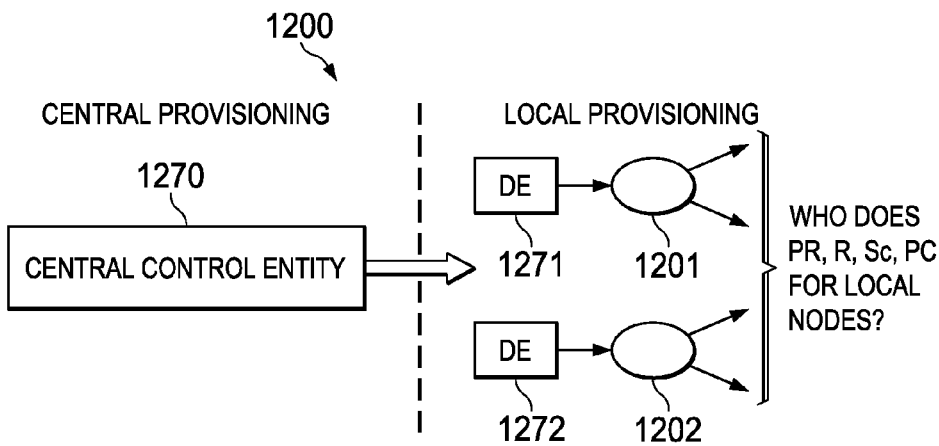
FIG. 12 illustrates a diagram of yet another embodiment network architecture.

Techniques of this disclosure can be performed (partially or entirely) by distributed entities. FIG. 12 illustrates a network architecture 1200 in which one or more tasks of a central control entity 1270 are performed by distributed entities 1271, 1272, which may be positioned near (or in) networks segments 1201, 1202. In one example, the central control entity 1270 gathers resource cost data from the networks 1201, 1202, computes a resource cost database based on the resource cost data, and distributes the resource cost database to the distributed entities 1271, 1272 for use in local provisioning. In some embodiments, the central control entity 1270 may also collect dynamic network loading information for the networks 1201, 1202, and distribute the dynamic loading information to the distributed entities 1271, 1272 for use in local provisioning. The interval in which dynamic loading information is distributed between distributed entities 1271, 1272 may be adjusted based on network conditions. For example, the interval can be lengthened (e.g., less frequent data exchanges) in slow-changing networks to reduce overhead and/or processing. Alternatively, the interval can be shortened (e.g., more frequent data exchanges) in fast-changing networks to increase prediction accuracy. Resource provisioning can also be sub-divided between the central control entity 1270 and distributed entities 1271, 1272, with some resource provisioning tasks/decisions being performed centrally, and others being performed locally. For example, admission control (AC) could be performed locally to reduce call set-up time, while routing policy decisions could be centrally. Any resource provisioning decision can be performed in a central or distributed manner depending on the configurations of the network, including (for example) probabilistic routing (PR) (e.g., the percentage of traffic distributed to each shared path), scheduling (sc), etc. In some embodiments, traffic policing may be performed in a distributed manner. In other embodiments, traffic policing may be inherent to AC.

Figure 13:
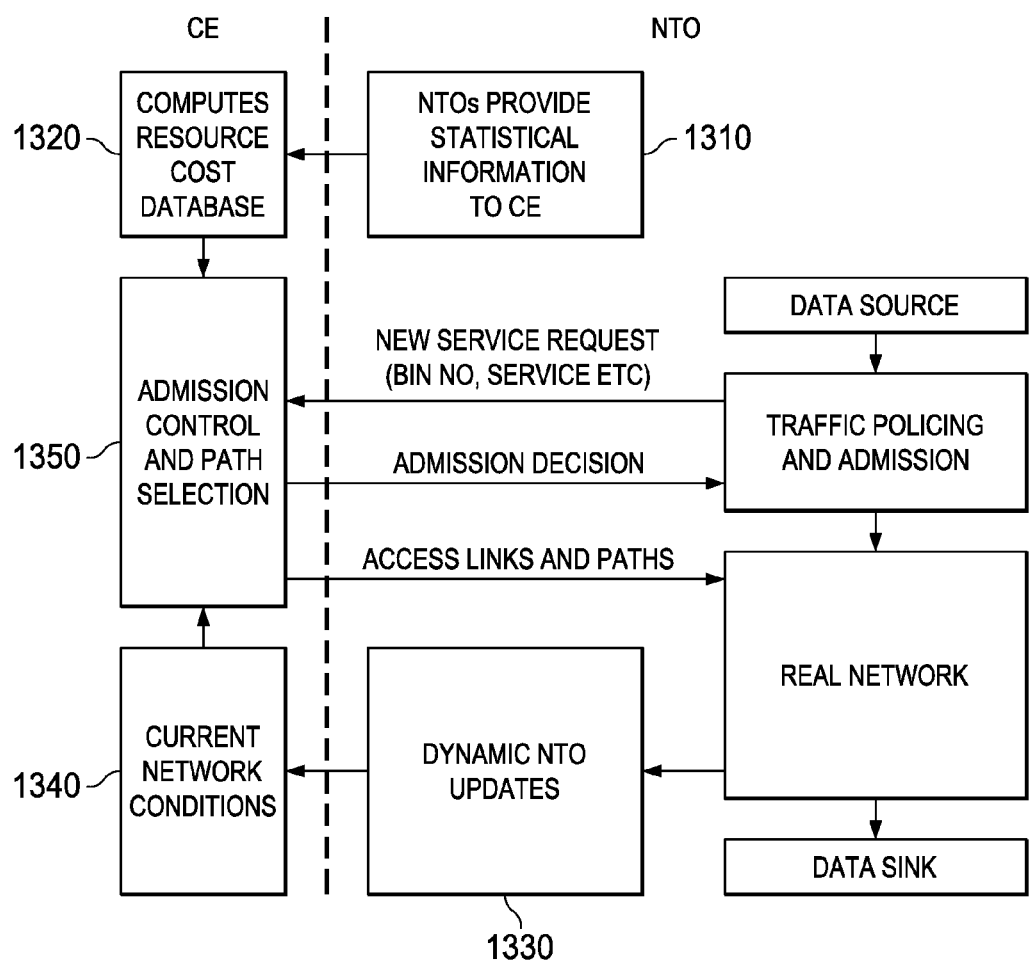
FIG. 13 illustrates a diagram of an embodiment communications sequence.

FIG. 13 illustrates a protocol diagram for an embodiment communications sequence 1300 between a central entity and one or more NTOs. As shown, the communications sequence 1300 begins with step 1310, where the NTOs communicate statistical information to the CE. In some embodiments, the statistical information includes bin-based resource cost data obtained from real-world data or simulations. Next, the communications sequence 1300 proceeds to step 1320, where the CE computes a resource cost database based on the statistical information provided by the NTOs. The resource cost database may specify interference costs as a function of loading on virtual radio interfaces in the network.

Thereafter, the communications sequence 1300 proceeds to step 1330, where the NTOs report dynamic updates to the central entity. The dynamic updates may include various real-time network parameters, such as loading, traffic patterns, latency, interference, and other information pertaining to the networks operated by the NTOs. Subsequently, the communications sequence 1300 proceeds to step 1340, where the central entity evaluates the current networks conditions in accordance with the dynamic updates provided by the NTOs. Thereafter, the communications sequence 1300 proceeds to step 1350, where the central entity makes admission and path selection for the network based on the resource cost database, the current network condition evaluation, and new service requests received by the NTOs.

Figure 14:
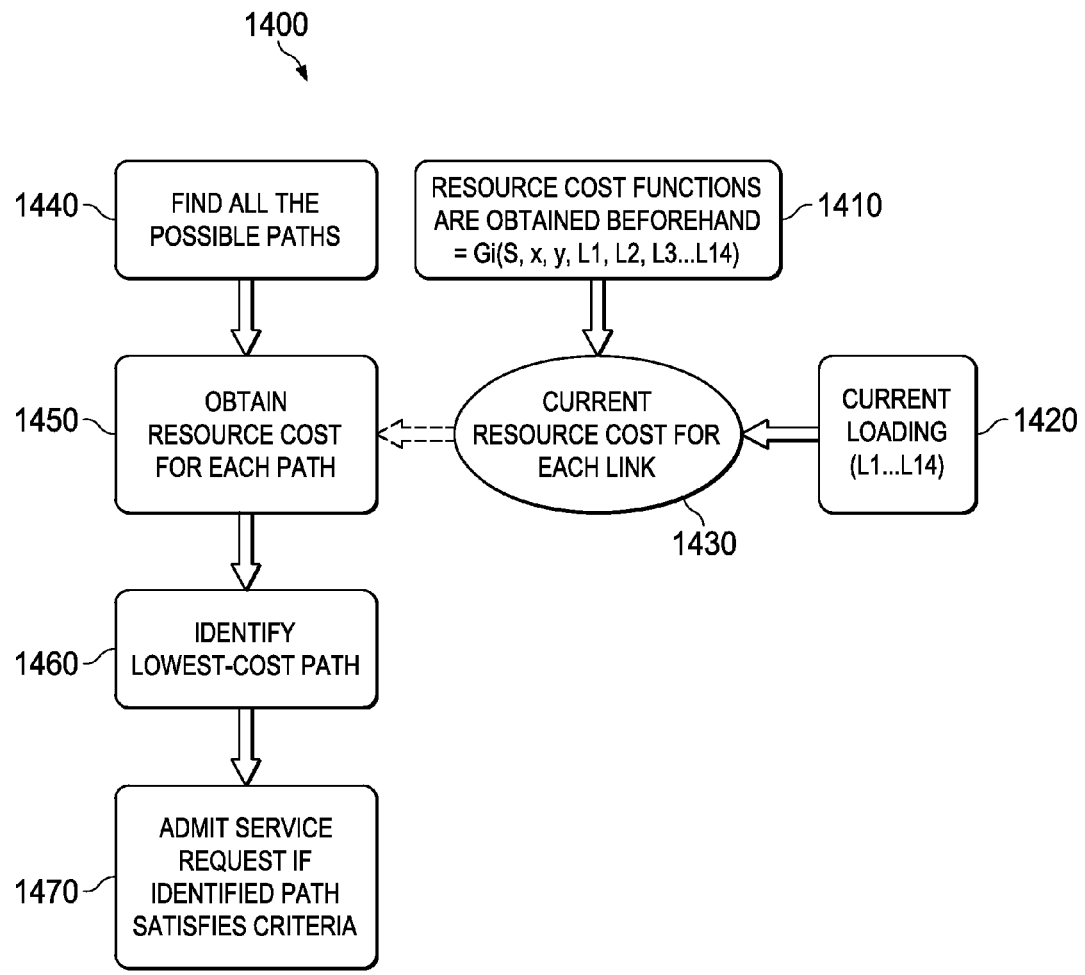
FIG. 14 illustrates a flowchart of an embodiment method for performing admission control and path selection.

Aspects of this disclosure provide admission control and path selection techniques that utilize resource cost estimates to achieve more efficient network resource allocation. FIG. 14 illustrates an embodiment method 1400 for performing admission control and path selection. As shown, the method 1400 begins with step 410, where resource cost functions are obtained. Thereafter, the method 1400 proceeds to step 420, where current loading information for the network is obtained. Subsequently, the method 1400 proceeds to step 1430, where current resource cost for each link is computed based on the resource cost functions and the current loading information. Next, the method 1400 proceeds to step 1440, where all possible paths for satisfying a service request are found. Thereafter, the method 1400 proceeds to step 1450, where a total resource cost for each path is obtained. A total resource cost for a path may be obtained by summing the current resource cost for each link in the path. Subsequently, the method 1400 proceeds to step 1460, where the lowest-cost path is identified. Thereafter, the method 1400 proceeds to step 1470, where the service request is admitted if the identified path satisfies a predefined criteria. The predefined criteria may require that the cost of the path is less than a threshold. Alternatively, the predefined criteria may require that the overall costs of network resources for a corresponding time interval is less than a threshold. Other predefined criteria are also possible.

Figure 15:
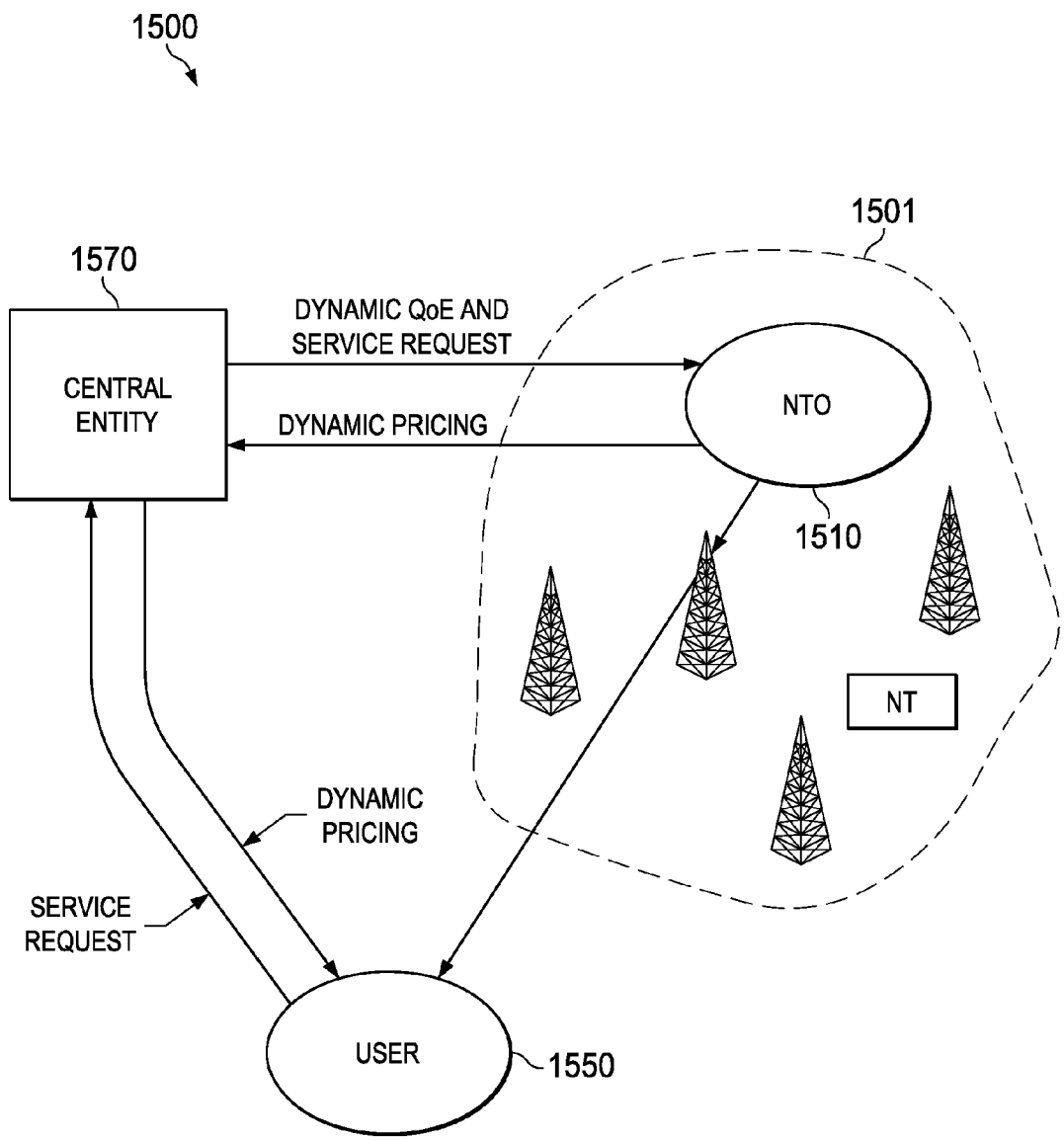
FIG. 15 illustrates a diagram of yet another embodiment network architecture.

In some embodiments, dynamic resource pricing (e.g., a price to be paid for using network resources) can be set based on resource cost estimations. The dynamic setting and/or updating of resource pricing can be coordinated by central entities. FIG. 15 illustrates a network architecture 1500 in which a central entity 1570 coordinates pricing of resources in a network 1501 between an NTO 1510 and a user 1550. The pricing may be adjusted based on resource availability and/or QoS requirements.

Aspects of this disclosure provide techniques for obtaining a cost function for predicting a cost of adding a service to a link.

Adding a service, session, or flow to a particular link may have an impact of the resource usage in the neighboring links. Specially, this would happen in the case of wireless links due to the interference a transmission could cause to the neighboring links. An embodiment algorithm is described as follows. A database tracks resource usage increase due to an addition of a new service to a link. The resource usage increase (which reflects the load increase) in a $j^{th}$ neighbor due to the addition of a session on link I is denoted as $\Delta L(i, j)$, and is evaluated offline and stored in the database. The database may also cover the cost when i=j, which provides the load increase in the assigned cell itself. Note that the load increase for other cells depends on bin location, service type and the load vector which includes the current load of the assigned cell ($i^{th}$ cell) and the load of all the neighbor cells. The aggregate load increase can be donated as follows: $[\Delta L(i, 1), \Delta L(i, 2) \ldots \Delta L(i, N_i)] = R_u(bin, assignedLink, serviceType, loadVector)$.

Once this load increase is known from the database, the cost function of the link j, $R_{cj}(.)$ could be used to evaluate the cost of increased load in that link as follows: Cost of load increase in jth link=$R_{cj}(\Delta L(i, j)+load(j))-R_{cj}(load(j))$. $R_{cj}(.)$ can be an increasing convex function in order to account for future possibility of admitting additional users to the link. When adding this cost for all the neighbors of the assigned link i, it is possible to obtain the total cost of the session assignment to link i using the following formula: $C_{link}(i) = \Sigma_{all\ j\ in\ ith\ neighbour\ list}[R_{cj}(\Delta L(i, j)+load(j))-R_{cj}(load(j))]$. Thereafter, the total cost of assigning a given session to a path k could be obtained by adding the cost of individual links in that path using the formula: $C_{path}(k) = \Sigma_{i=all\ links\ in\ route\ k} C(i)$. Finally, the route/path with minimum cost can be selected as the least cost route for that service. In cases where the database contains actual cost values (taking the impacts to the neighbors as well), evaluation for CBRAC can be simplified by adding the cost of individual links. When resource usage increase data is provided by the NTOs, the system becomes more flexible without changing the database entries, as the NTO can change the resource usage to cost conversion function depending on the situation (e.g. for competitive needs).

Figure 16:
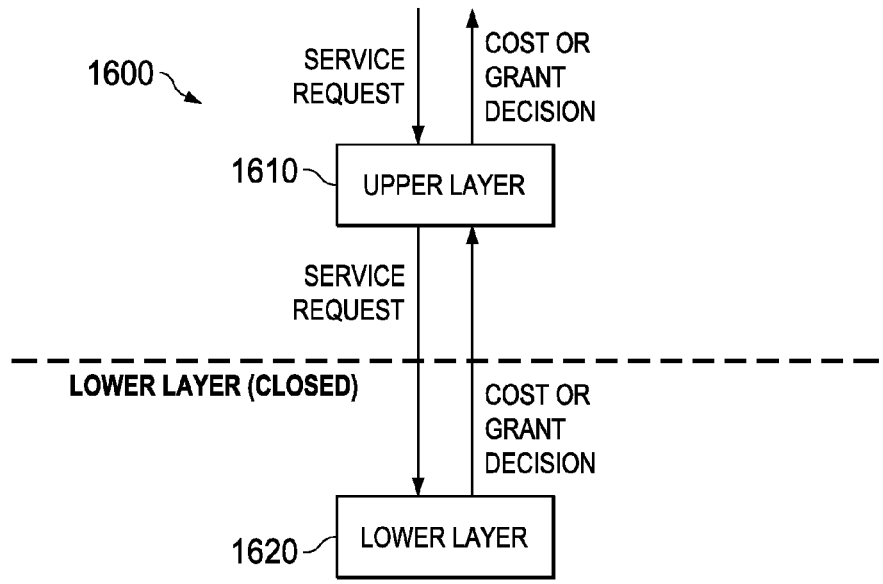
FIG. 16 illustrates a diagram of yet another embodiment network architecture.

Network layer abstraction can be used to increase provisioning efficiency. Absent abstraction, admission control decisions may be performed at the lowest layer. FIG. 16 illustrates a network architecture 1600 for admission control in which an upper layer 1610 (e.g., a central entity) communicates service requests to a lower layer 1620 (e.g., an NTO) for approval. In this example, the lower layer 1620 remains completely closed (e.g., not distribute dynamic internal information).

It may be inefficient for each respective NTO to remain in complete control of user admission, particularly in cases where a central entity is interacting with (e.g., negotiating, etc.) a large number of NTOs. Specifically, call setup times may experience significant delays due to the latency involved in communicating request and grant information between the central entities and the NTOs.

Figure 17:
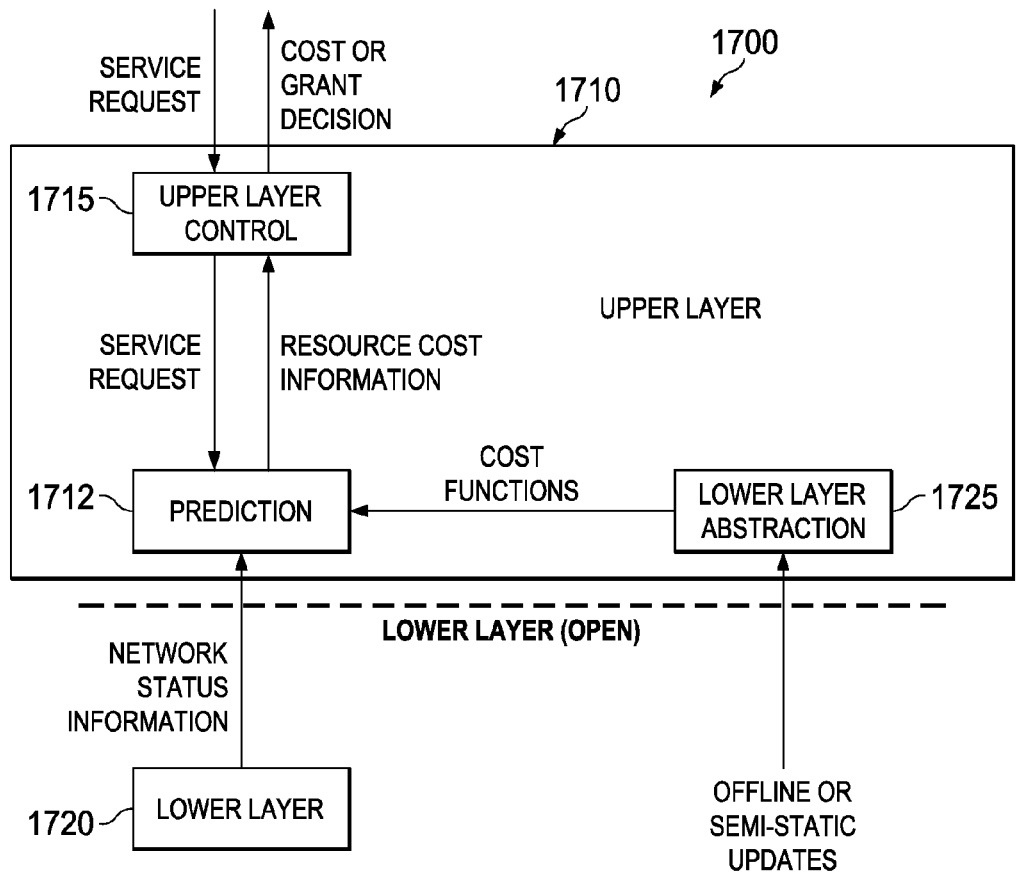
FIG. 17 illustrates a diagram of yet another embodiment network architecture.

Aspects of this disclosure may reduce these delays through abstraction. FIG. 17 illustrates a network architecture 1700 for admission control in which an upper layer 1710 performs admission control based on dynamic and static information retrieved from a lower layer 1720. As shown, the upper layer 1720 includes a prediction module 1712, a control module 1715, and a lower layer abstraction module 1725. The lower layer abstraction module 725 retrieves resource cost information from the lower layer 720 via offline or semi-static updates, consolidates the resource cost information (e.g., builds resource cost database, etc.), and provides corresponding cost functions to the prediction module 1712. The prediction module 1712 retrieves dynamic network status information from the lower layer 1720, which is used to estimate resource cost information for service requests received from the control module 1715. The resource cost information is forwarded to the control module 1715, where the resource cost information is used to make admission control decisions.

Figure 18:
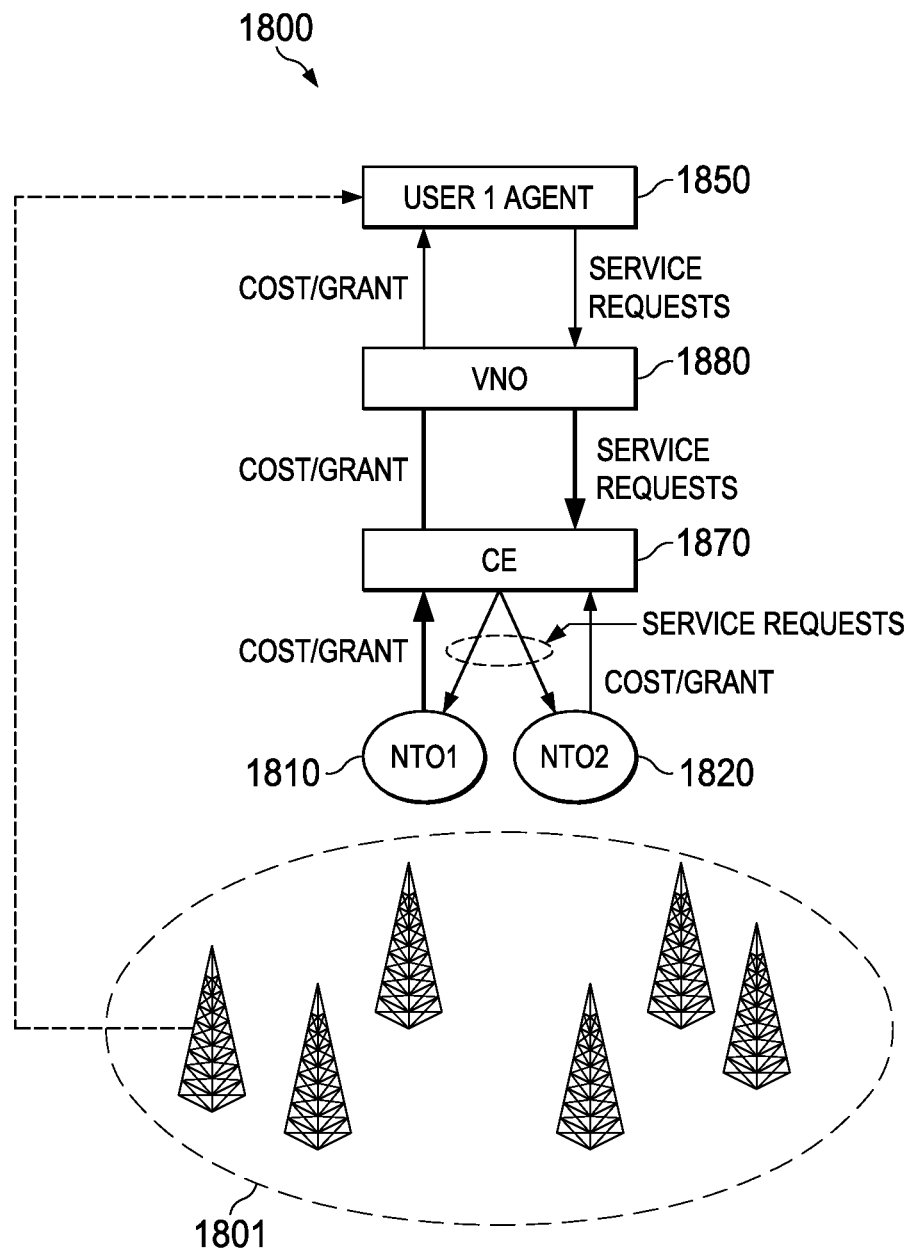
FIG. 18 illustrates a diagram of yet another embodiment network architecture.

In some networks, central entities may simply facilitate the distribution of loading information to different network operators. FIG. 18 illustrates a network architecture 1800 in which admission control is performed by NTOs 1810 and 1820 of a network 1801. As shown, the central entity 1870 and virtual network operator 1880 merely relay the service requests and cost/grant decisions between the user agents 1850 and the NTOs 1810 and 1820, which may result in provisioning inefficiencies, e.g., delayed session establishment, etc. These provisioning inefficiencies can be avoided and/or reduced through network abstraction.

Figure 19:
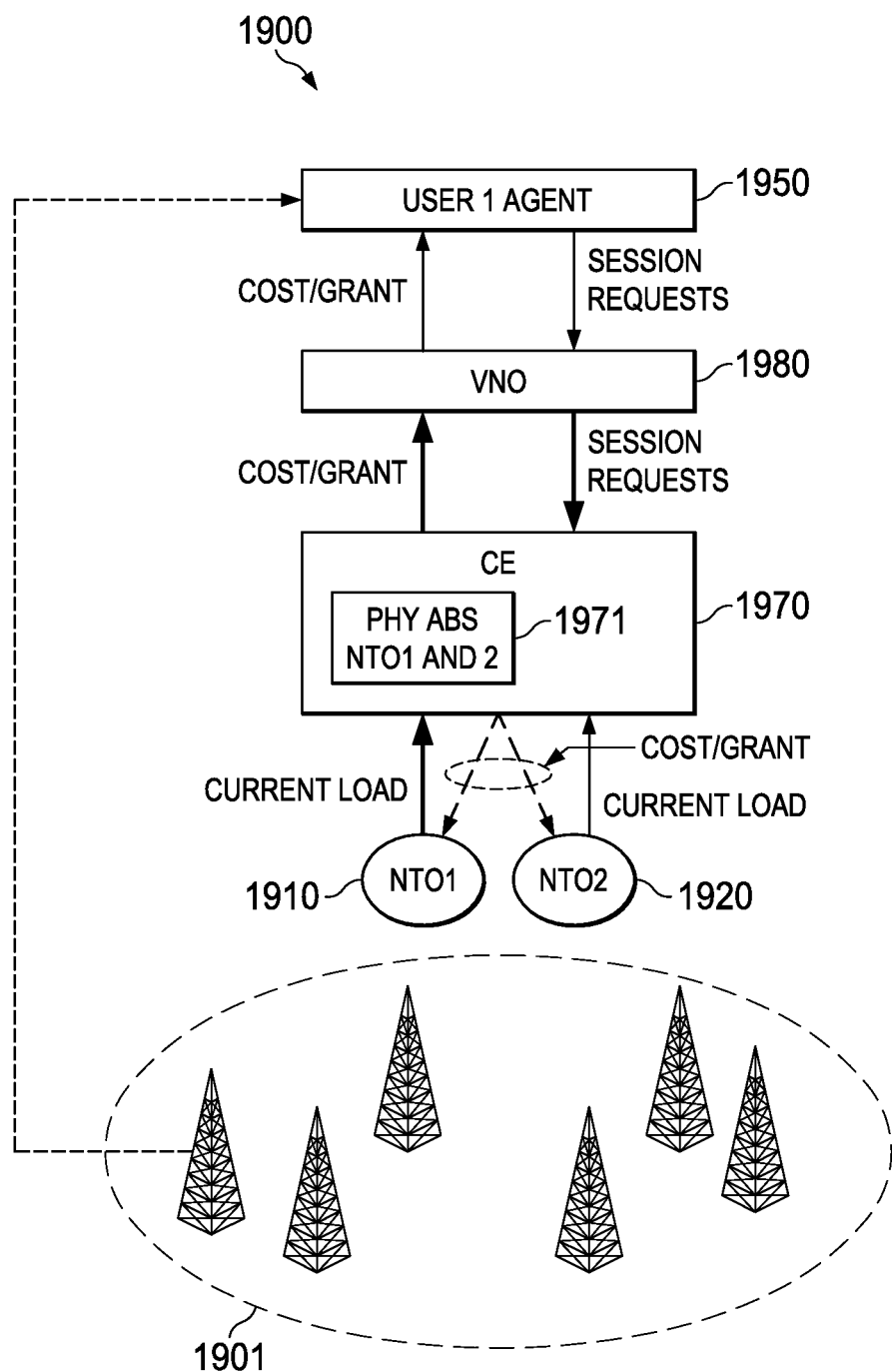
FIG. 19 illustrates a diagram of yet another embodiment network architecture.

FIG. 19 illustrates a network architecture 1900 in which admission control for a wireless network 1901 is performed by a central entity 1970. Notably, the central entity 1970 includes a network abstraction module 1971 for the NTOs 1910 and 1920, which may store/retrieve dynamic loading information and/or a resource cost data for the wireless network 1901. As shown, the VNO 1980 relays service requests from the user agent 1950 to the central entity 1970. The central entity 1970 generates cost/grant decisions, which are distributed to the NTOs 1910, 1920. In some embodiments, the cost/grant decisions may include flow information (e.g., QoS requirements of service flow). The central entity 1970 also distributes the cost/grant decisions to the VNO 1980, which relays the cost/grant decisions to the user agent 1950.

Figure 20:
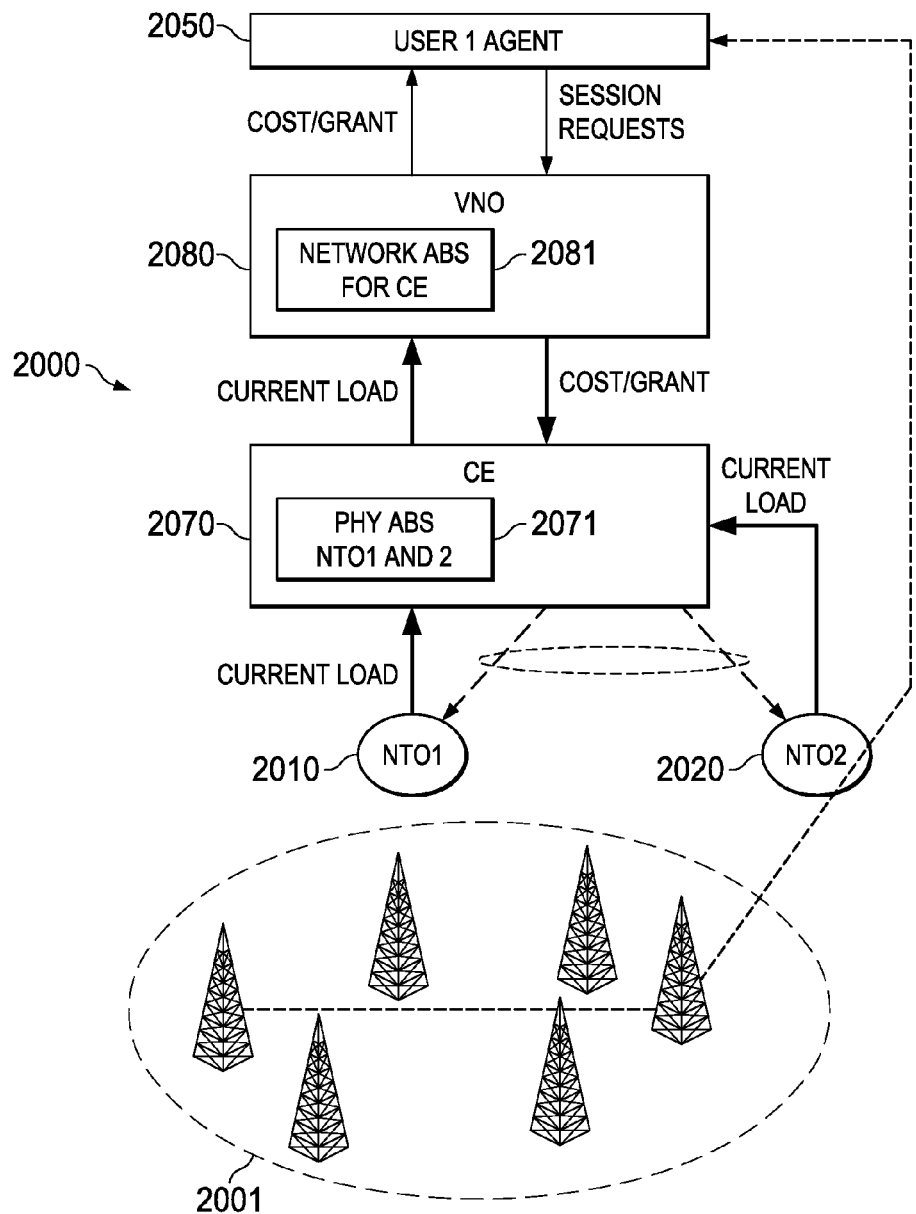
FIG. 20 illustrates a diagram of yet another embodiment network architecture.

Provisioning efficiency may be further improved by network abstraction between a central entity and a virtual network operator. FIG. 20 illustrates a network architecture 2000 in which admission control for a wireless network 2001 is performed by a virtual network operator 2080. Notably, the virtual network operator 2080 includes a network abstraction module 2081 for the CE 2070, and the central entity 2070 includes a network abstraction module 2071 for the NTOs 2010 and 2020. The VNO 2080 responds to service requests from the user agent 2050.

Figure 21:
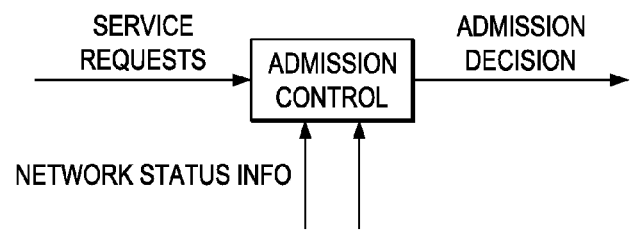
FIG. 21 illustrates a diagram of an embodiment admission controller.
Figure 22:
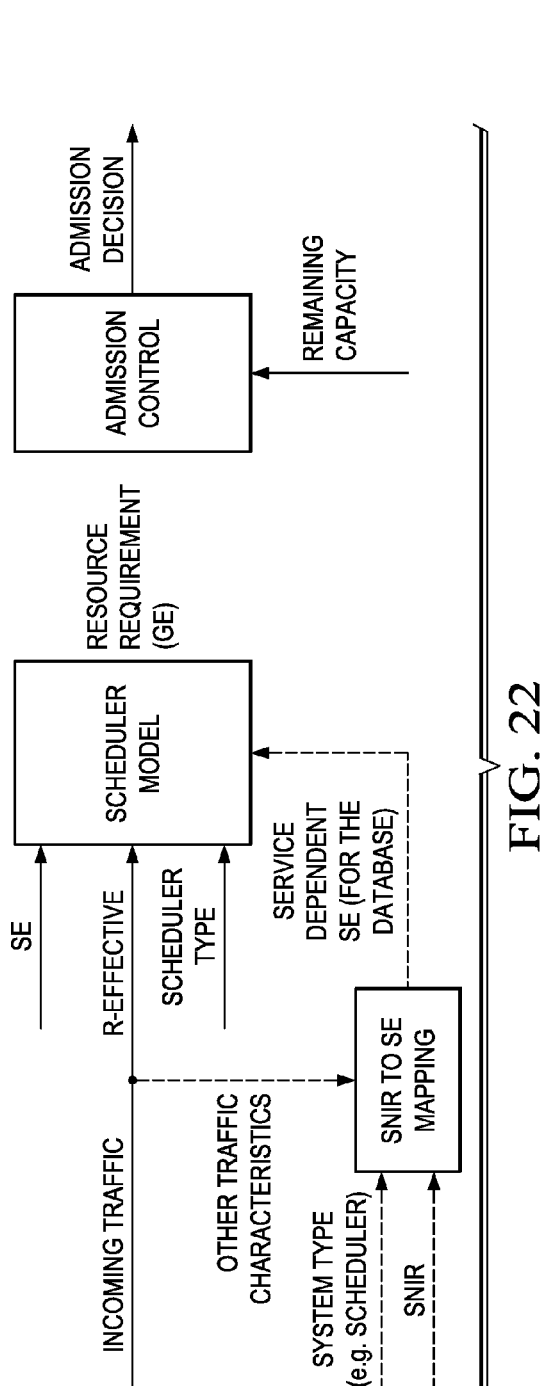
FIG. 22 illustrates a diagram of an embodiment admission control system.
Figure 23:
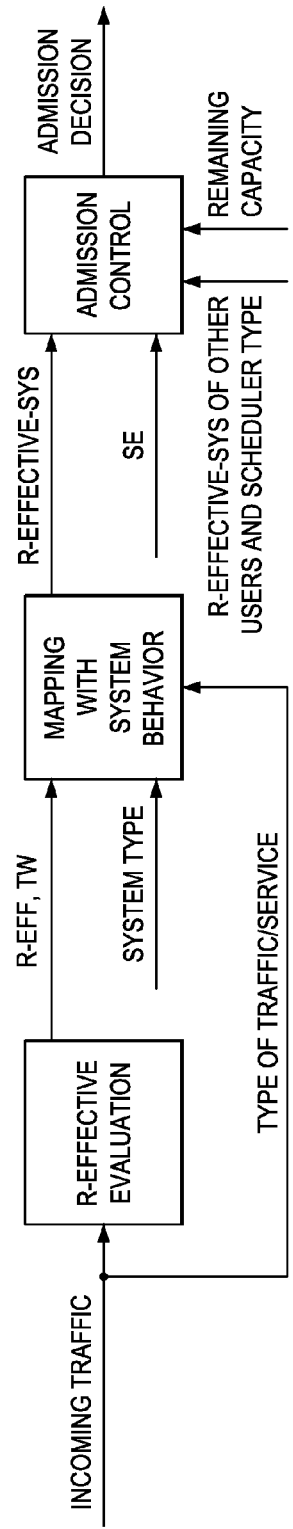
FIG. 23 illustrates a diagram of another embodiment admission control system.
Figure 24:
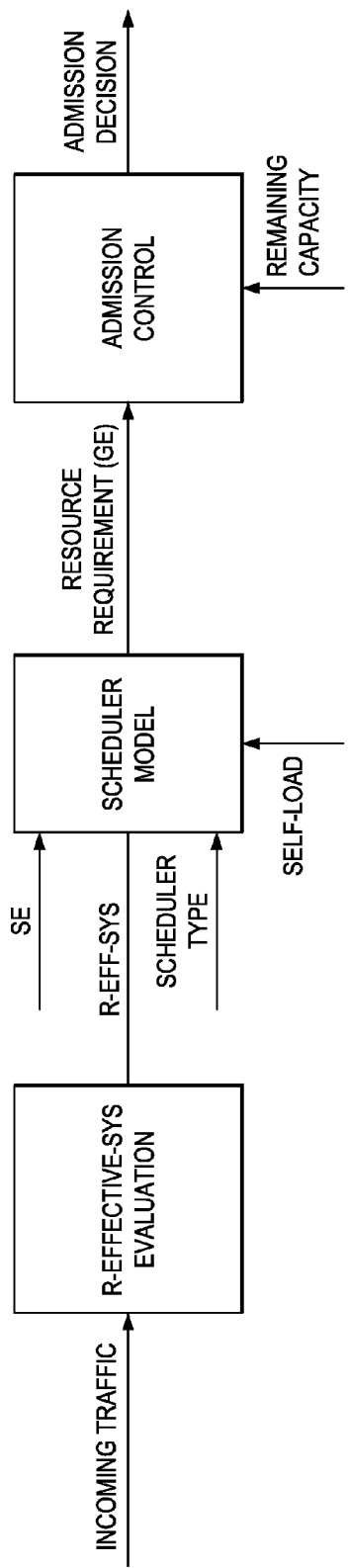
FIG. 24 illustrates a diagram of yet another embodiment admission control system.
Figure 25:
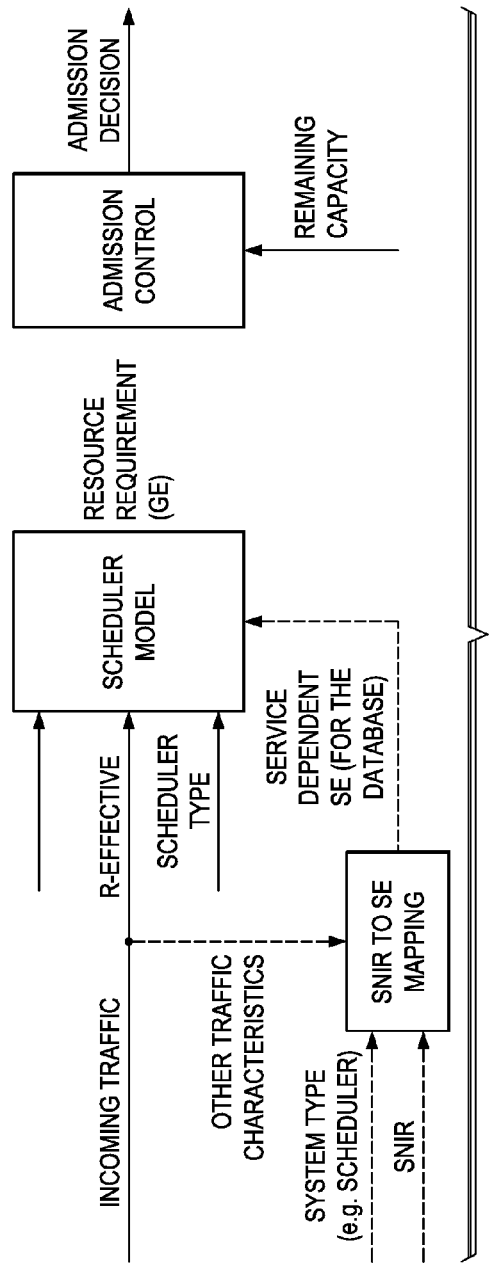
FIG. 25 illustrates a diagram of yet another embodiment admission control system.

Aspects of this disclosure provide various architectures for performing admission control. FIG. 21 illustrates a diagram of an admission controller that generates admission decisions based on service requests. The service request may specify path information (e.g., resource efficiency, path loss, etc.) and a bin location of the requesting mobile device. In the event that multiple paths/APs are available, the service request may specify path information for each path/AP. The admission control unit may also receive network status information (e.g., spectral efficiency of other users, interference, loading, remaining capacity, etc.) from the network. FIG. 22 illustrates an embodiment admission control system that estimates resource requirements for service requests prior to making admission control decisions. FIGS. 23-25 illustrate embodiment admission control systems that estimates the spectral efficiency of the network prior to making admission control decisions. When a session request arrives depending on the service type and the system characteristics the spectral efficiency might change. Therefore, the spectral efficiency will not only be a function of the geolocation and the neighbor loading, buy also a function of the service type of existing flows and/or new service sessions. This can be captured by the central controller using a special scheduler modeling or full service based database. System behavior captured in the database may be referred to as R-effective-Sys. For admission control, the resource requirement can be directly evaluated by knowing the spectral efficiency (SE) and the R-effective-sys. FIG. 24 illustrates how a scheduler model is passed to the central controller. As shown, the serving cell loading may be an input to the scheduler model. In FIG. 25, the SNIR is provided as the input and the SE is evaluated based on the system type, R-effective and the scheduler type.

Aspects of this disclosure provide resource cost databases that correlate spectral efficiency (SE) on a link to loading on surrounding links. FIG. 26 illustrates an embodiment network for which a resource cost database is computed, and FIG. 27 illustrates the resource cost database portion for the network depicted in FIG. 26. As shown, different spectral efficiencies (SE1, SE2, SE3, SE4) for links/traffic flows (d1, d2, d3, d4) are associated with different load values (L1, L2) of the geographic bin. The load value L1 may correspond to an existing load on a link associated with BS1, and the load value L2 may correspond to an existing load on a link associated with BS2. Notably, the spectral efficiencies tend to decrease as the load values L1, L2 increase.

Figure 29:
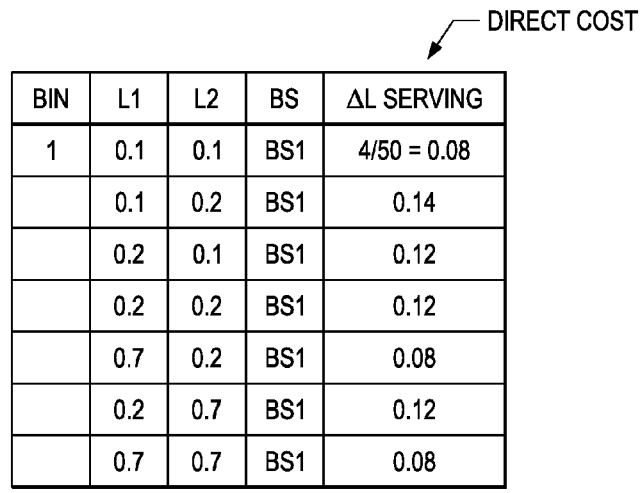
FIGS. 29-30 illustrate diagrams of additional embodiment resource cost database portions.
Figure 30:
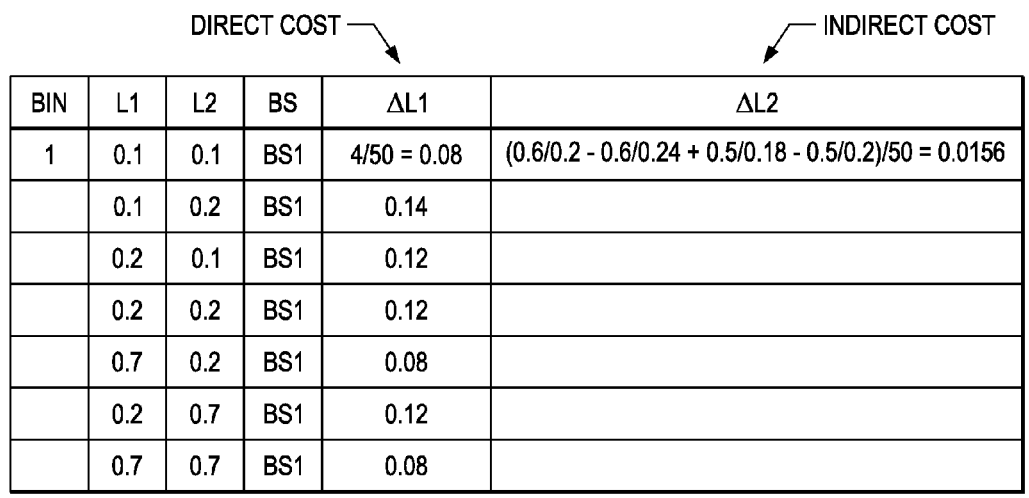

Aspects of this disclosure provide resource cost databases that compute direct and indirect interference costs of transporting additional traffic on a link. FIG. 28 illustrates an embodiment network for which a resource cost database is computed, and FIGS. 29-30 illustrate portions of a resource cost database for the network depicted in FIG. 28. As shown in FIG. 29, a direct cost ($\Delta L1$) for transporting additional traffic over a first link varies based on existing load values (L1, L2) of the geographic bin. As shown in FIG. 30, an indirect cost ($\Delta L2$) for transporting additional traffic over the first link also varies based on existing load values (L1, L2) of the geographic bin.

The following references are related to subject matter of the present application. Each of these references is incorporated herein by reference in its entirety: [1] Abstract—Cost-based admission control for Internet Commerce QoS enhancement available at http://www.sciencedirect.com/science/article/pii/S1567422308000604 (no access to full paper); [2] "Integrated Cost-Based MAC and Routing Techniques for Hop Count Forwarding in Wireless Sensor Networks" Michele Rossi, Member, IEEE, and Michele Zorzi, Fellow, IEEE; [3] "Quality of Service Routing in Ad-Hoc Networks Using OLSR", Ying Ge et. al. CRC, Proceedings of the 36th Hawaii International Conference on System Sciences (HICSS'03); [4] "Cost-based routing", Ying Ge et al., available at http://www.crc.gc.ca/en/html/manetsensor/home/research_area/costbase_routing; "A Scalable Solution to Minimum Cost Forwarding in Large Sensor Networks"; [6] "Least-cost routing" Wikipedia, http://en.wikipedia.org/wiki/Least-cost_routing; [7] Mostafa Zaman Chowdhurya, Yeong Min Janga, and Zygmunt J. Haasb, Department of Electronics Engineering, Kookmin University, Korea "Call Admission Control based on Adaptive Bandwidth Allocation for Multi-Class Services in Wireless Networks", *Wireless Networks Lab*, Cornell University, Ithaca, N.Y., 14853, U.S.A; [8] "Minimum cost traffic Shaping: A user's perspective on connection admission control", Matthias Falkner, Michael Davetsikiotis, Ioannis Lambadaris, Carleton University.

One embodiment of this disclosure is summarized as follows: For a service to be accepted, all the possible paths through the network is first found (this is knowing the available links and their topology). The cost of each link in the path is evaluated using the current link loading and the Resource Cost Function of that link. The sum of the link costs for each path is found and the minimum cost path is found. The costs could be weighted by the energy saving algorithms and make the decision. For example, to keep one node active, there should be step-wise price increase. Alternatively, the admission is done based on the total cost and internally the network operator choose to send them in another link if total traffic could be managed by a single path. A session is to be admitted by a remote controller by only knowing the current loading of each associated link in a selected path.

Aspects of this disclosure may include Resource Cost Tables (RCTs), which may be described as follows: A NTO could provide the RCT based on the assessment of the amount of resources needed for various flows based on location/SNIR and the business aspect of the value of resources based on the loading. An RCT may be a long-term matrix and (may be developed using self-learning) and only updated occasionally (e.g., when user distribution changes). An RCT may be a function of: Flow attributes (e.g. QoS, flow priority); Loading of the node and adjacent nodes (if the link is a backhaul link loading at both nodes); If the link is a shared point to multi-point radio link the node locations; The impact of the flows adding to the links in the same or adjacent coverage areas.

Figure 31:
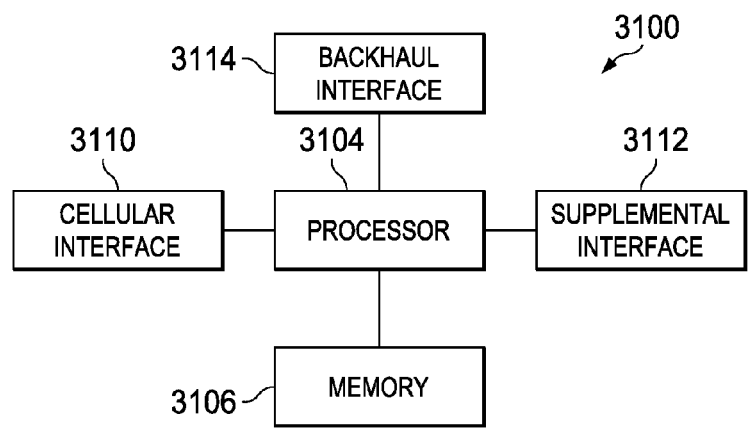
FIG. 31 illustrates a block diagram of an embodiment of a communications device.

FIG. 31 illustrates a block diagram of an embodiment of a communications device 3100, which may be equivalent to one or more devices (e.g., UEs, NBs, etc.) discussed above. The communications device 3100 may include a processor 3104, a memory 3106, a cellular interface 3110, a supplemental interface 3112, and a backhaul interface 3114, which may (or may not) be arranged as shown in FIG. 31. The processor 3104 may be any component capable of performing computations and/or other processing related tasks, and the memory 3106 may be any component capable of storing programming and/or instructions for the processor 3104. The cellular interface 3110 may be any component or collection of components that allows the communications device 3100 to communicate using a cellular signal, and may be used to receive and/or transmit information over a cellular connection of a cellular network. The supplemental interface 3112 may be any component or collection of components that allows the communications device 3100 to communicate data or control information via a supplemental protocol. For instance, the supplemental interface 3112 may be a non-cellular wireless interface for communicating in accordance with a Wireless-Fidelity (Wi-Fi) or Bluetooth protocol. Alternatively, the supplemental interface 3112 may be a wireline interface. The backhaul interface 3114 may be optionally included in the communications device 3100, and may comprise any component or collection of components that allows the communications device 3100 to communicate with another device via a backhaul network.

Figure 32:
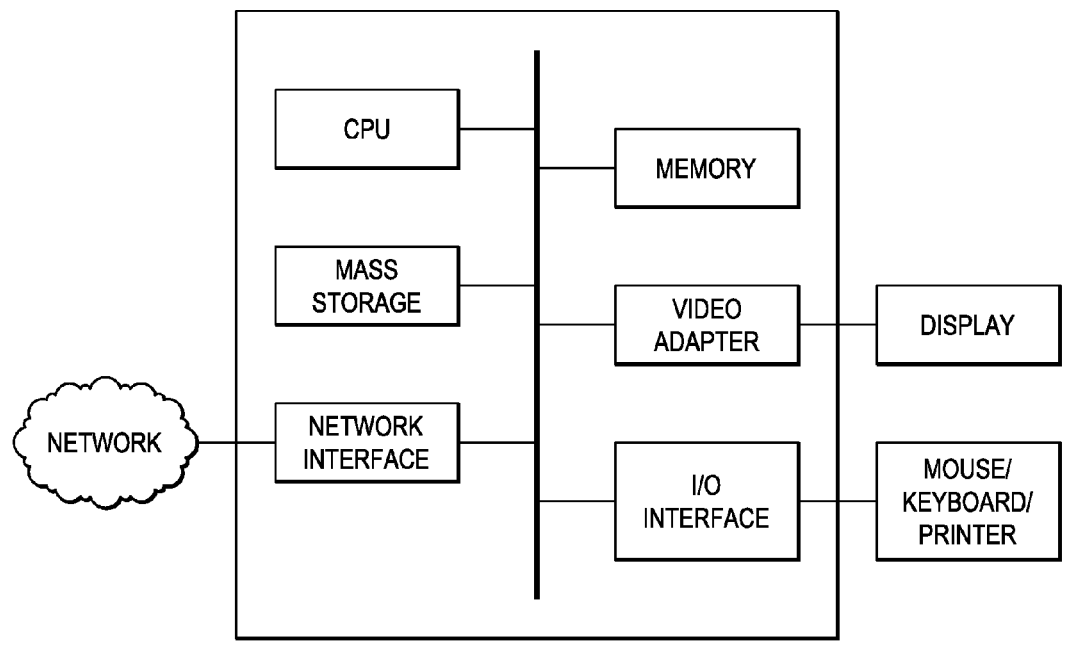
FIG. 32 illustrates a block diagram of an embodiment processing system.

FIG. 32 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. For example, when there are cooperative transmissions, the percentage of traffic for each path need to be used when evaluating the resource cost for a given service. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for provisioning resources, the method comprising:
    obtaining, by a device, a resource cost database for a wireless network, the resource cost database specifying an interference cost on a first virtual link as a function of loading on a second virtual link, wherein the first virtual link corresponds to a first radio interface and the second virtual link corresponds to a second radio interface, and wherein the first radio interface and the second radio interface are available for carrying traffic in the wireless network;
    gathering network loading information for the wireless network, the network loading information corresponding to an initial interval; and
    provisioning network resources for a subsequent interval in accordance with the network loading information and the resource cost database, wherein provisioning network resources for the subsequent interval in accordance with the network loading information and the resource cost database comprises calculating an interference cost estimate over the first virtual link based on a load on the second virtual link using the function of loading on the second virtual link specified by the resource cost database, and provisioning resources over at least one of the first virtual link and the second virtual link based on the interference cost estimate on the first virtual link.

2. The method of claim 1, wherein provisioning the network resources for the subsequent interval comprises:
    receiving a service request for transporting a traffic flow over the wireless network during the subsequent interval;
    determining that the second virtual link is capable of transporting the traffic flow;
    estimating a cost of transporting the traffic flow over the second virtual link during the subsequent interval in accordance with the network loading information and the resource cost database; and
    granting the service request when the estimated cost satisfies a criteria.

3. The method of claim 2, wherein estimating a cost of transporting the traffic flow over the second virtual link comprises:
  estimating a reduction in spectral efficiency on at least the first virtual link as a result of interference produced from transporting the traffic flow over the second virtual link.

4. The method of claim 2, wherein estimating a cost of transporting the traffic flow over the second virtual link comprises:
  estimating, in accordance with the resource cost database, a resource cost for transporting the traffic flow over the second virtual link, the estimated resource cost including a direct component and at least one indirect component,
  wherein the direct component corresponds to an amount of resource required to transport the traffic flow over the second virtual link, and
  wherein the at least one indirect component corresponds to a reduction in available resources on the first virtual link as a result of transporting the traffic flow over the second virtual link.

5. The method of claim 4, wherein the virtual first link and the second virtual link are associated with the same geographical bin, wherein the first virtual link corresponds to a first access point, and wherein the second virtual link correspond to a second access point that is different than the first access point.

6. The method of claim 5, wherein gathering the network loading information for the wireless network comprises:
  receiving the network loading information corresponding to the first access point and the second access point, the network loading information being reported dynamically according to a first set of intervals.

7. The method of claim 6, further comprising:
  receiving resource cost data corresponding to the first access point and the second access point, the resource cost data being reported semi-statically according to a second set of intervals, the second set of intervals being less frequent than the first set of intervals; and
  updating the resource cost database in accordance with the resource cost data.

8. The method in claim 1, wherein provisioning network resources for a subsequent interval in accordance with the network loading information and the resource cost database comprises:
  estimating a resource availability for each of two or more geographical bins in a service region of the wireless network using the network loading information in accordance with the resource cost database, wherein the resource cost database specifies a correlation between spectral efficiency in the two or more geographical bins and loading in the wireless network.

9. A method for provisioning resources, the method comprising:
  obtaining, by a device, a resource cost database for a wireless network, the resource cost database specifying an interference cost on a first virtual link as a function of loading on a second virtual link, wherein the first virtual link corresponds to a first radio interface and the second virtual link corresponds to a second radio interface, and wherein the first radio interface and the second radio interface are available for carrying traffic in the wireless network;
  gathering network loading information for the wireless network, the network loading information corresponding to an initial interval; and
  provisioning network resources for a subsequent interval in accordance with the network loading information and the resource cost database,
  wherein provisioning the network resource for the subsequent interval comprises receiving a service request for transporting a traffic flow over the wireless network during the subsequent interval, identifying the first virtual link as a candidate for transporting the traffic flow, estimating, in accordance with the resource cost database, an amount of required resources needed to transport the traffic flow over the first virtual link estimating a resource availability on the first virtual link in accordance with the network loading information and the resource cost database, and granting the service request when the estimated amount of required resources exceeds the estimated resource availability by at least a threshold.

10. The method of claim 9, wherein estimating the amount of required resources needed to transport the traffic flow over the first virtual link comprises:
  estimating the amount of required resources needed to transport the traffic flow over the first virtual link in accordance with a service type of the traffic flow.

11. The method in claim 9, wherein the interference cost corresponds to a reduction in spectral efficiency on the first virtual link as a result of a traffic load carried over the second virtual link.

12. The method in claim 9, wherein the first radio interface and the second radio interface are associated with different access points (APs).

13. The method of claim 9, wherein the resource cost database includes historical interference information for the first virtual link and historical loading information for the second virtual link, the historical interference information corresponding to interference measured over the first virtual link during a first period, and the historical loading information corresponding to loading on the second virtual link during the first period.

14. The method of claim 9, wherein the resource cost database specifies a correlation between interference measured over the first virtual link and loading on the second virtual link.

15. The method of claim 9, wherein the resource cost data includes simulated interference information for the first virtual link and simulated loading information for the second virtual link.

16. A method for provisioning resources, the method comprising:
  obtaining, by a device, a resource cost database for a wireless network, the resource cost database specifying an interference cost on a first virtual link as a function of loading on a second virtual link, wherein the first virtual link corresponds to a first radio interface and the second virtual link corresponds to a second radio interface, and wherein the first radio interface and the second radio interface are available for carrying traffic in the wireless network;
  gathering network loading information for the wireless network, the network loading information corresponding to an initial interval; and
  provisioning network resources for a subsequent interval in accordance with the network loading information and the resource cost database, wherein provisioning the network resource for the subsequent interval comprises receiving a service request requesting transporting of a traffic flow over the wireless network during a subsequent interval, determining that the first virtual link and a third virtual link are capable of transporting the traffic flow, the third virtual link corresponding to a third radio interface of the wireless network, estimating a first resource cost for transporting the traffic flow over the first virtual link in accordance with the network loading information and the resource cost database, estimating a second resource cost for transporting the traffic flow over the third virtual link in accordance with the network loading information and the resource cost database, and assigning the traffic flow to the first virtual link when the second resource cost exceeds the first resource cost.

17. The method in claim 16, wherein the interference cost corresponds to a reduction in spectral efficiency on the first virtual link as a result of a traffic load carried over the second virtual link.

18. The method in claim 16, wherein the first radio interface and the second radio interface are associated with different access points (APs).

19. The method of claim 16, wherein the resource cost database includes historical interference information for the first virtual link and historical loading information for the second virtual link, the historical interference information corresponding to interference measured over the first virtual link during a first period, and the historical loading information corresponding to loading on the second virtual link during the first period.

20. The method of claim 16, wherein the resource cost database specifies a correlation between interference measured over the first virtual link and loading on the second virtual link.

21. The method of claim 16, wherein the resource cost data includes simulated interference information for the first virtual link and simulated loading information for the second virtual link.

22. A device comprising:
a processor; and
a non-transitory computer readable storage medium storing programming for execution by the processor, the programming including instructions to:
   obtain a resource cost database for a wireless network, the resource cost database specifying an interference cost on a first virtual link as a function of loading on a second virtual link, wherein the first virtual link corresponds to a first radio interface and the second virtual link corresponds to a second radio interface, and wherein the first radio interface and the second radio interface are available for carrying traffic in the wireless network;
   gather network loading information for the wireless network for an initial interval; and
   provision network resources for a subsequent interval in accordance with the network loading information and the resource cost database, wherein the instructions to provision network resources for the subsequent interval in accordance with the network loading information and the resource cost database includes instructions to calculate an interference cost estimate over the first virtual link based on a load on the second virtual link using the function of loading on the second virtual link specified by the resource cost database, and to provision resources over at least one of the first virtual link and the second virtual link based on the interference cost estimate on the first virtual link.

23. The device of claim 22, wherein the device further comprises:
a network abstraction unit corresponding to a first access region of the wireless network, the network abstraction unit configured to collect at least some of the network loading information from the first access region of the wireless network.

* * * * *